F. B. REDINGTON & M. J. MILMOE.
CHEWING GUM WRAPPING MACHINE.
APPLICATION FILED MAR. 22, 1913.
1,133,668.
Patented Mar. 30, 1915.
9 SHEETS—SHEET 1.
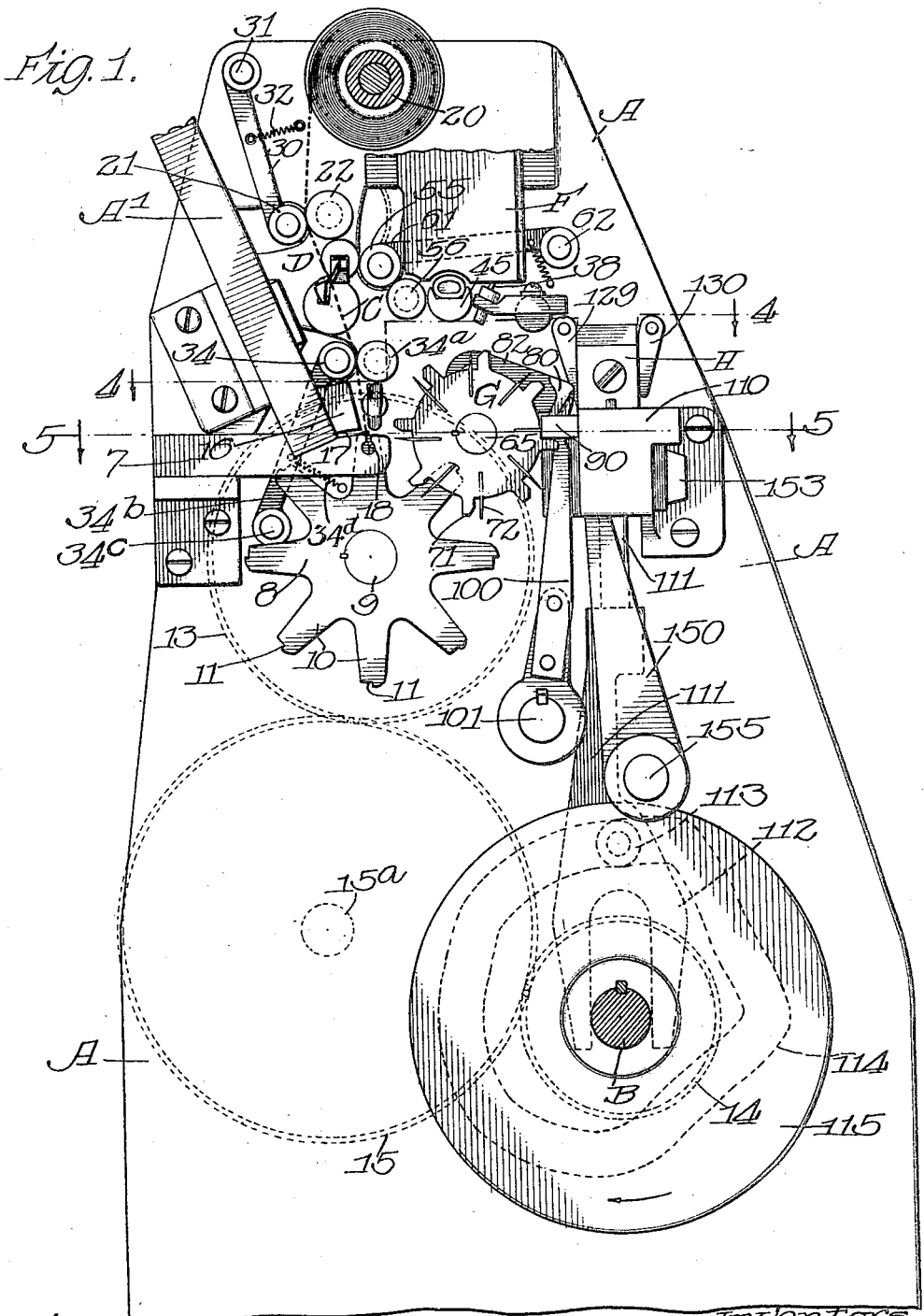

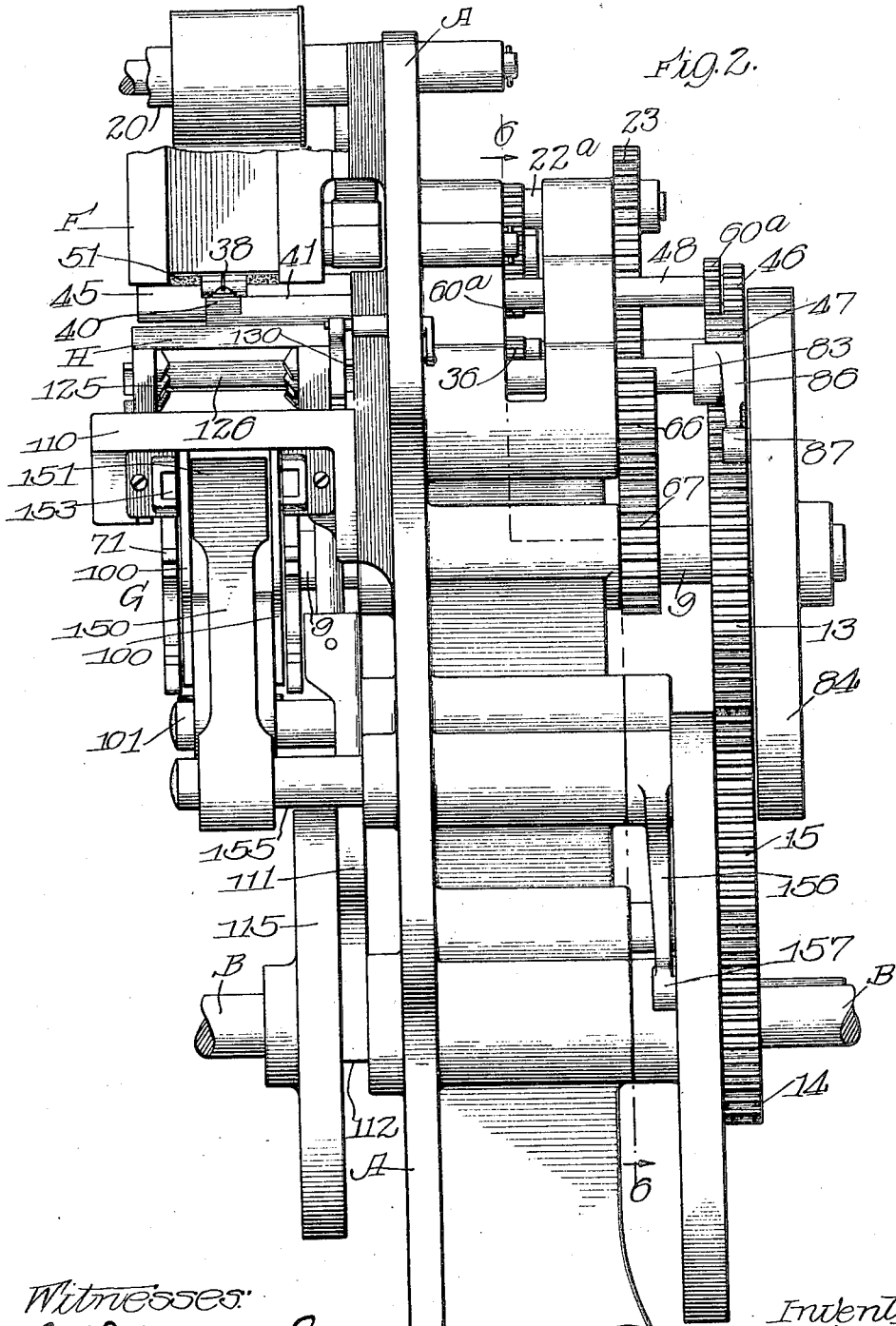

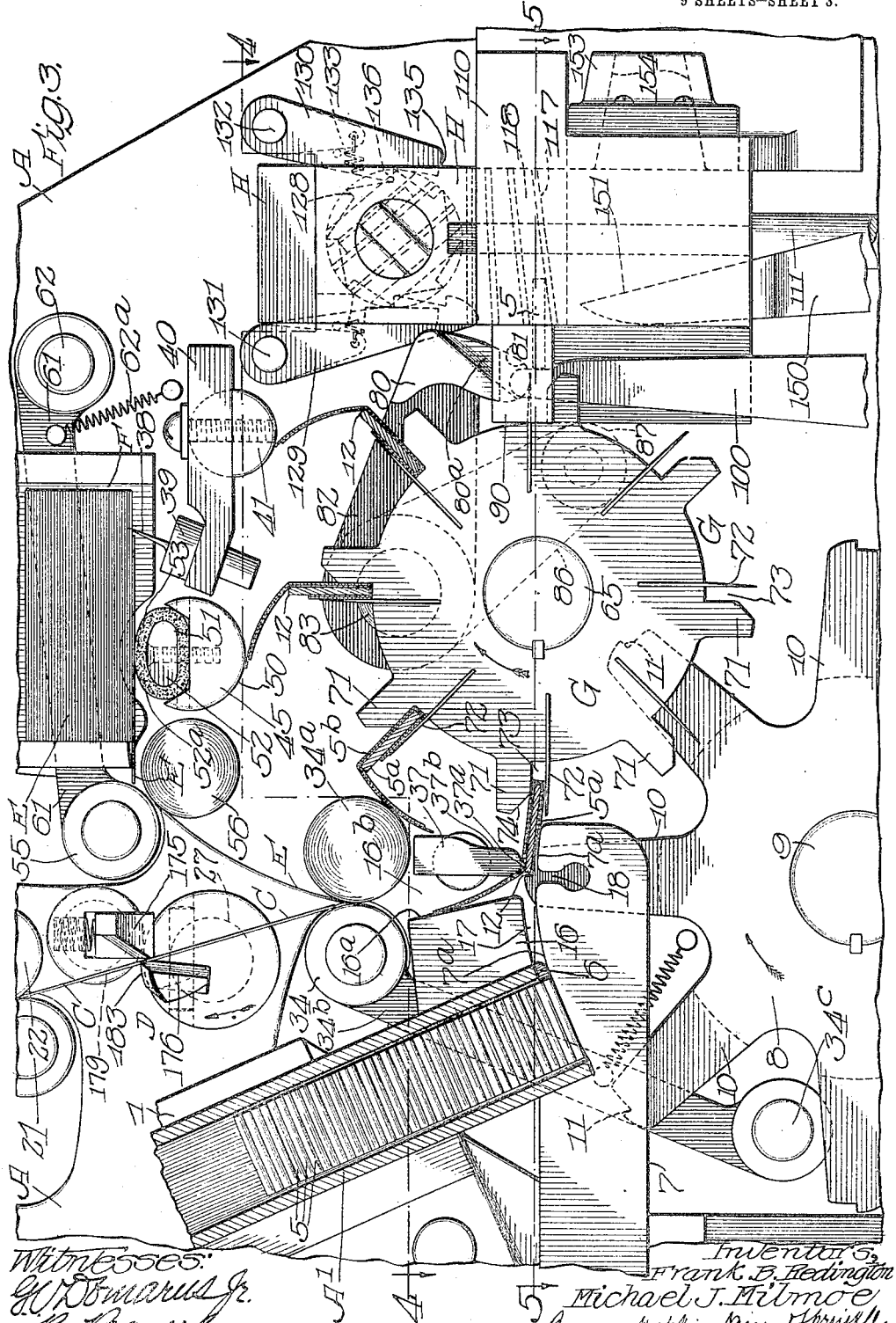

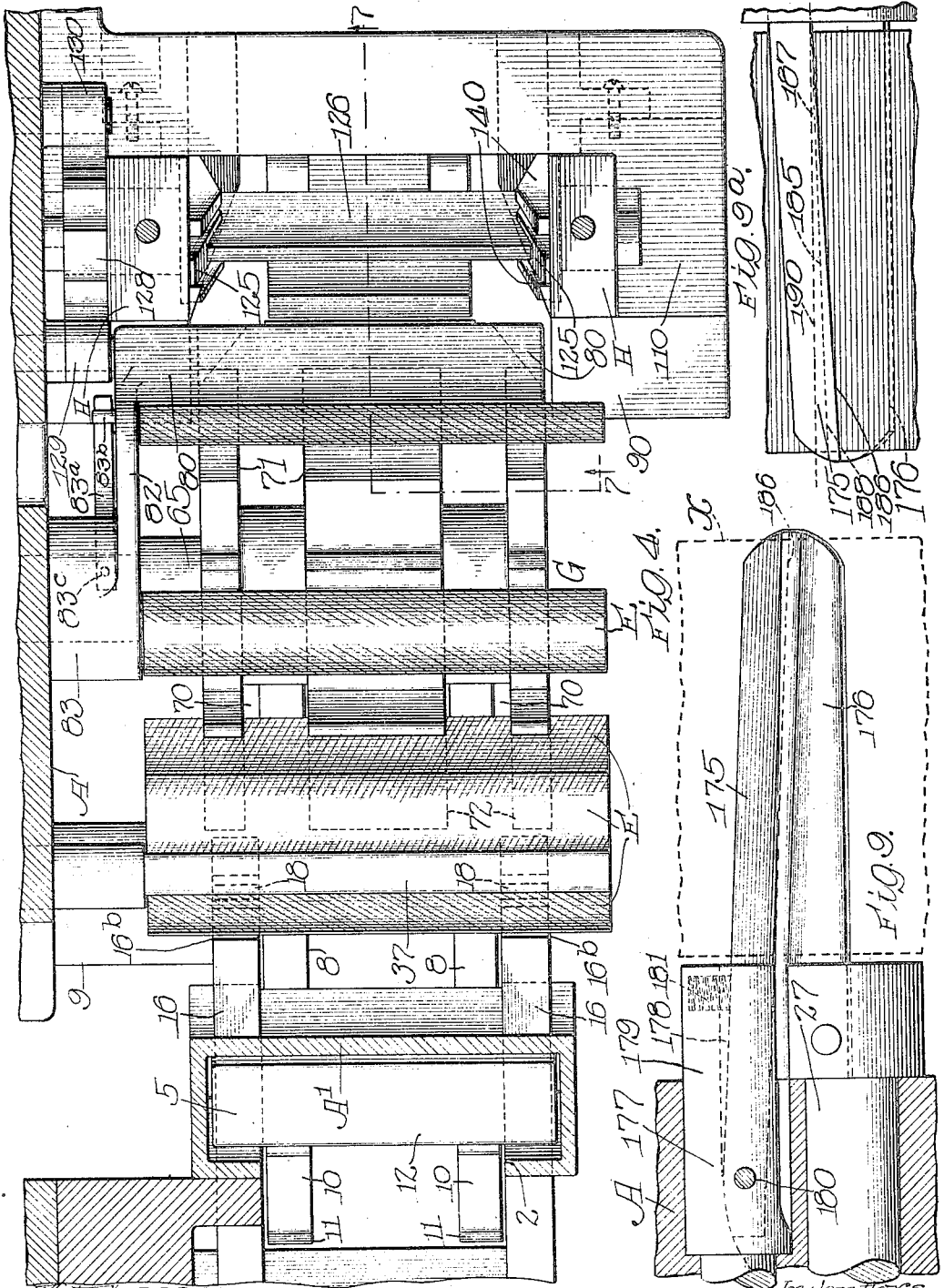

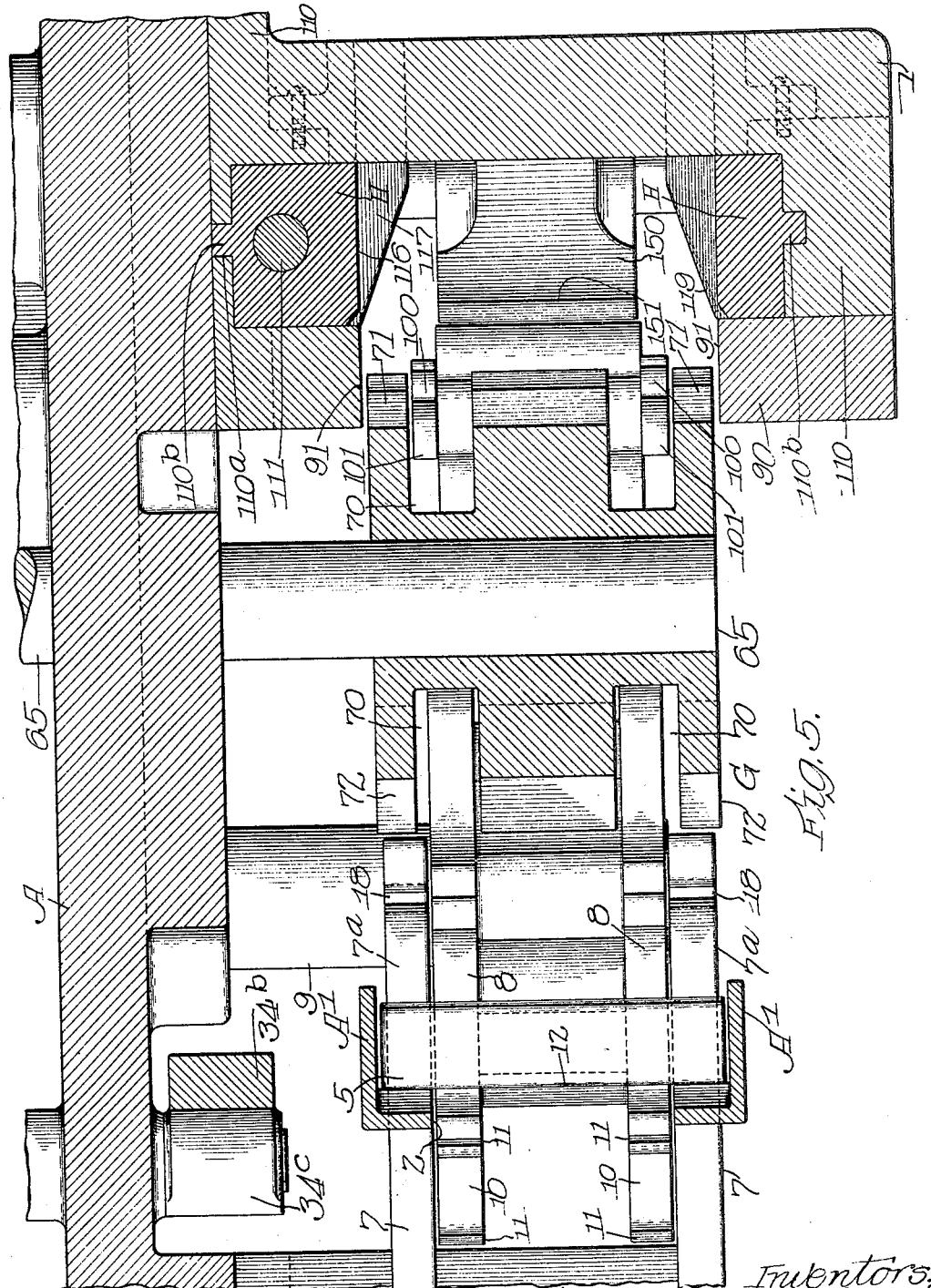

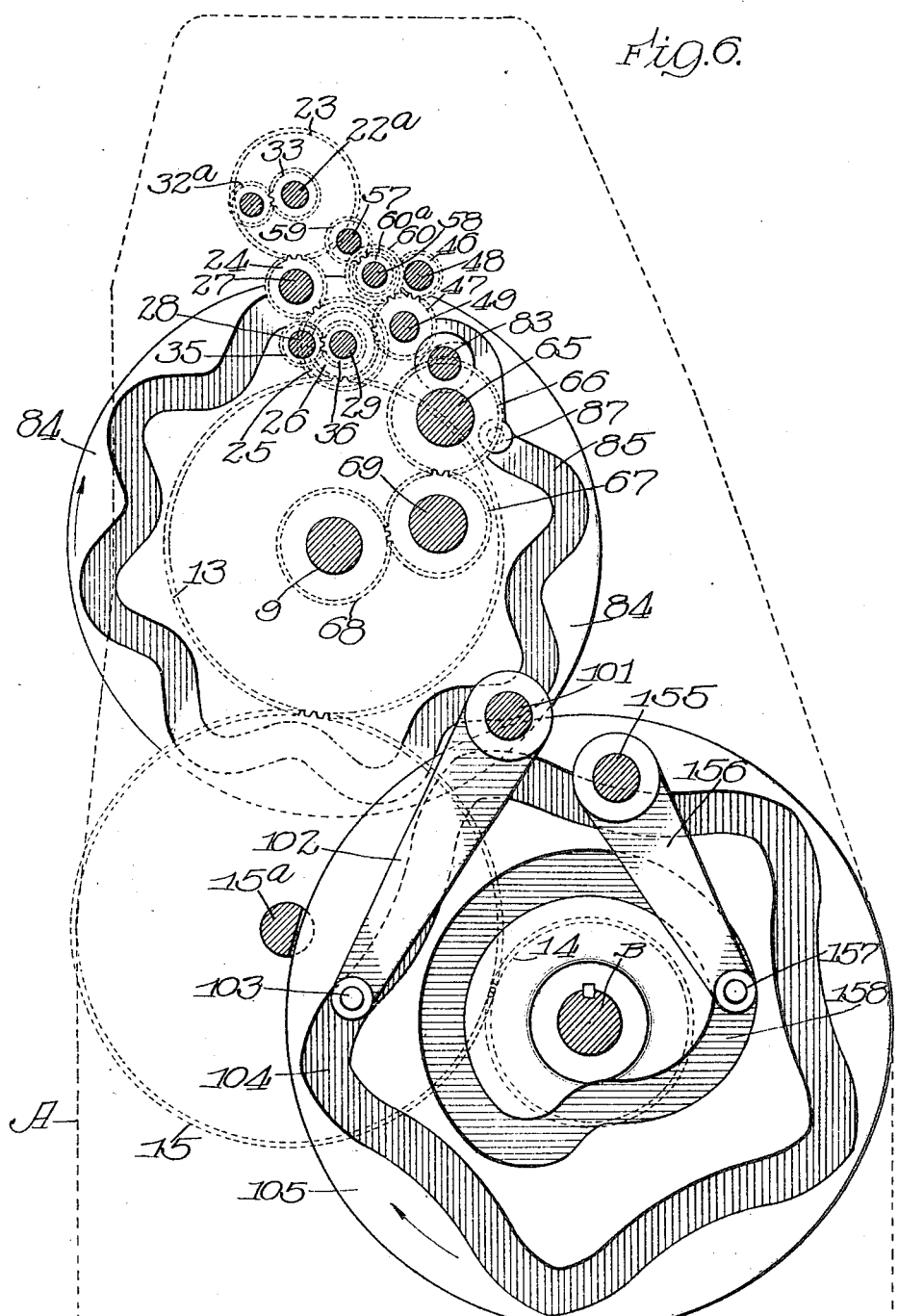

F. B. REDINGTON & M. J. MILMOE.
CHEWING GUM WRAPPING MACHINE.
APPLICATION FILED MAR. 22, 1913.
1,133,668. Patented Mar. 30, 1915.
9 SHEETS—SHEET 7.
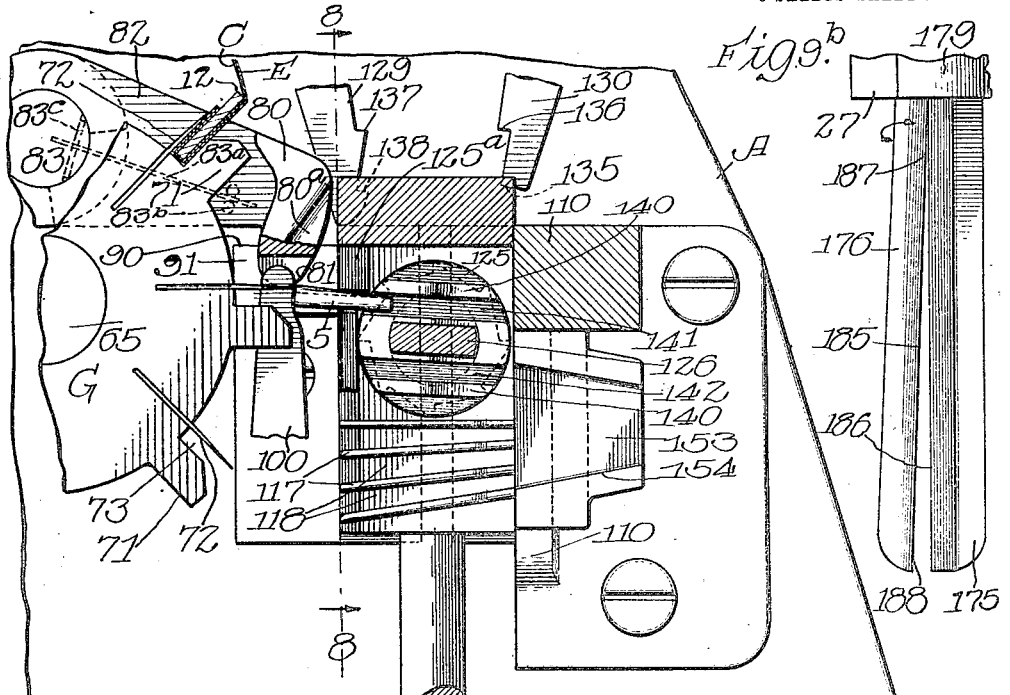
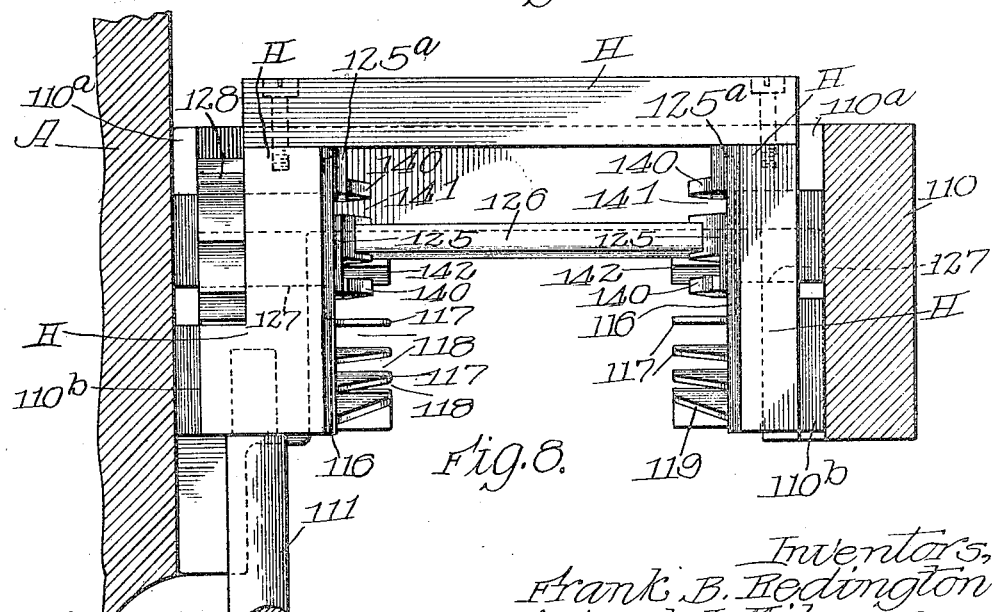
Inventors,
Frank B. Redington
Michael J. Milmoe F. B. REDINGTON & M. J. MILMOE.
CHEWING GUM WRAPPING MACHINE.
APPLICATION FILED MAR. 22, 1913.
1,133,668.
Patented Mar. 30, 1915.
9 SHEETS—SHEET 8.
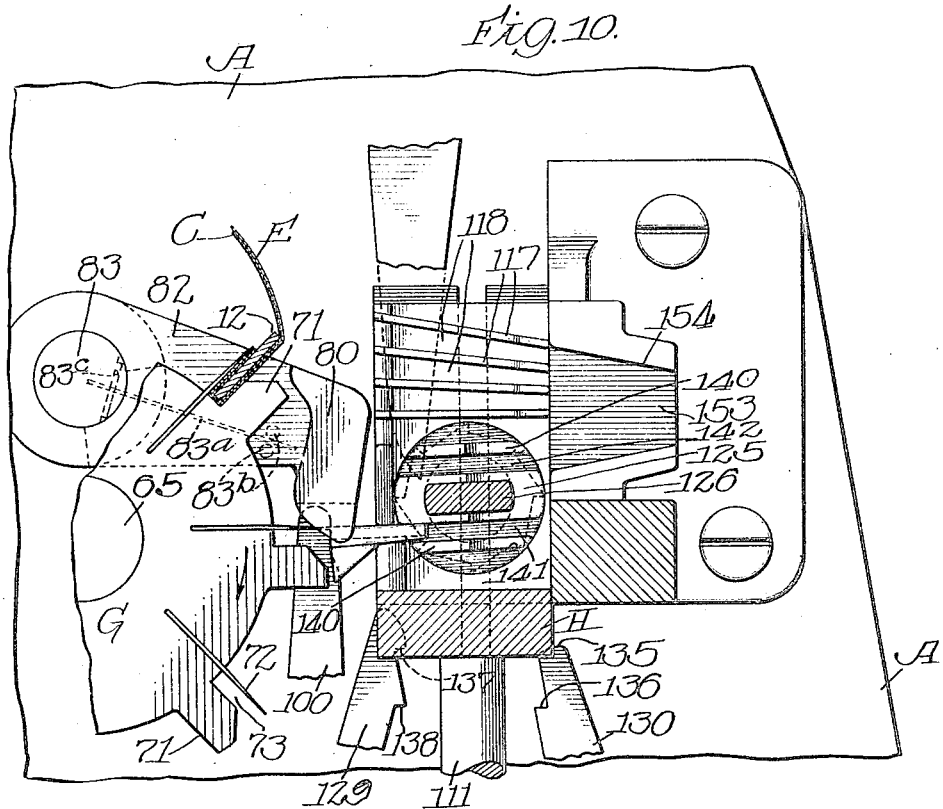
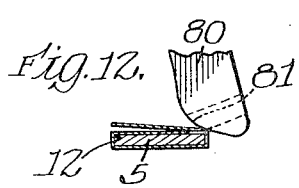
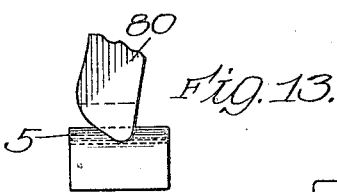
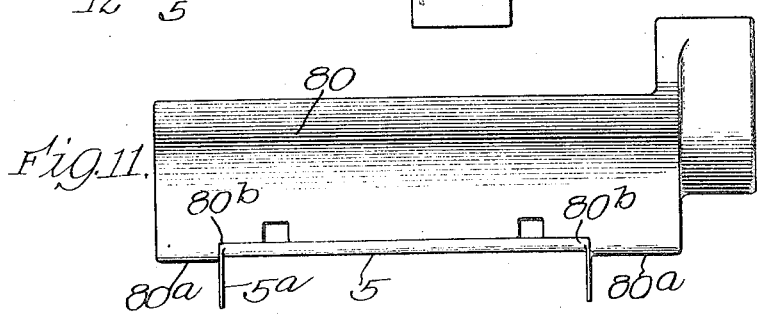
Witnesses:
Inventors,
Frank B. Redington
Michael J. Milmoe

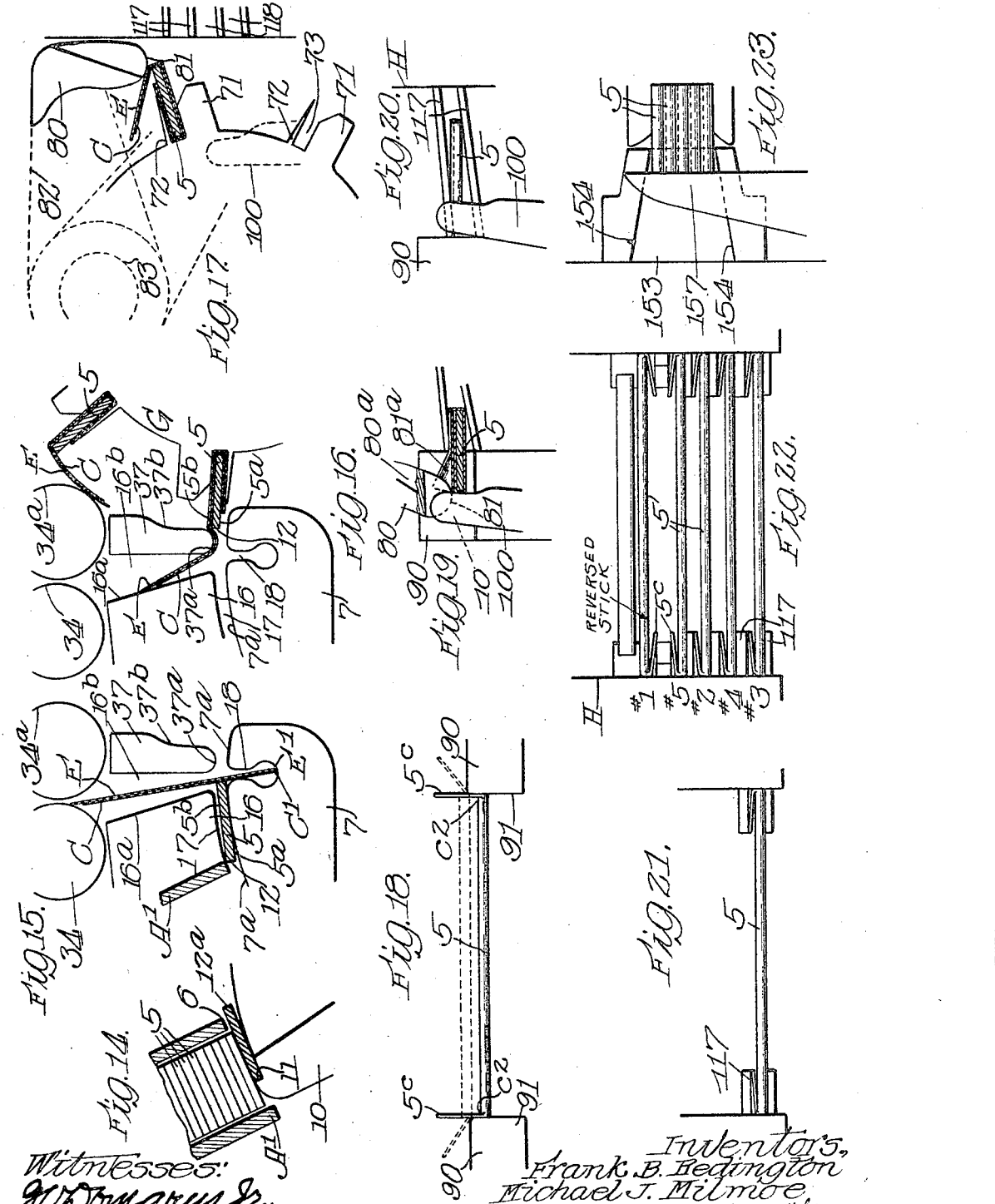

UNITED STATES PATENT OFFICE.

FRANK B. REDINGTON AND MICHAEL J. MILMOE, OF CHICAGO, ILLINOIS, ASSIGNORS, BY MESNE ASSIGNMENTS, TO PACKAGE MACHINERY COMPANY, OF SPRINGFIELD, MASSACHUSETTS, A CORPORATION OF MASSACHUSETTS.

CHEWING-GUM-WRAPPING MACHINE.

1,133,668.    Specification of Letters Patent.    Patented Mar. 30, 1915.

Application filed March 22, 1913. Serial No. 756,087.

*To all whom it may concern:*

Be it known that we, FRANK B. REDINGTON and MICHAEL J. MILMOE, citizens of the United States, residing at Chicago, in the county of Cook and State of Illinois, have invented certain new and useful Improvements in Chewing-Gum-Wrapping Machines, of which the following is a specification.

Our invention relates to improvements in wrapping machines for packing or wrapping small articles of merchandise such as sticks of chewing gum and the like articles, and the object of our invention is to provide an improved machine which will be simple, durable and reliable in construction and rapid and entirely automatic in operation, and which will produce an improved securely wrapped article of neat and acceptable appearance.

Other objects of our invention will appear hereinafter.

To this end our invention consists in the features of novelty exemplified in the construction, combination and arrangement of parts herein described, and shown in the accompanying drawings which illustrate one embodiment of my invention, and more particularly pointed out in the appended claims.

In the drawings: Figure 1 is a view in elevation of the right hand face or side of a gum-wrapping machine embodying our invention. Fig. 2 is a view in elevation of the front or magazine end of said machine. Fig. 3 is an enlarged fragmentary view in elevation of the right hand face of the principal gum handling and wrapping parts. Fig. 4 is a plan view looking downwardly substantially on the line 4—4 of Figs. 1 and 3, the gum magazine and frame being shown in section. Fig. 5 is a plan sectional view on the line 5—5 of Figs. 1 and 3. Fig. 6 is a vertical sectional view on the line 6—6 of Fig. 2, the various operating shafts, gears and cams for actuating the gum wrapping parts being located relatively to each other. Fig. 7 is a detail longitudinal vertical section of the reverser, and the assembler or collector and associated parts on the line 7—7 of Fig. 4. Fig. 8 is a vertical transverse view in elevation of the "reverser" and assembler on the line 8—8 of Fig. 7. Fig. 9 is an enlarged detail view of the shears for cutting the individual wrappers from the end of the supply strip of paper or wrapper material, the strip being dotted in cutting relation. Fig. 9$^a$ is a detail view of the shears from the opposite faces thereof, illustrating the manner in which the moving strip is cut on a transverse line. Fig. 9$^b$ is a top plan view of the shears showing the angular relation of the two shear blades. Fig. 10 is a view similar to Fig. 7 but showing the mechanism slightly modified for turning the end folds oppositely to the manner in which they are folded by the mechanism shown in the preceding figures. Fig. 11 is a detail of the folder arm used in connection with the modified parts of Fig. 10. Figs. 12 and 13 are detail views diagrammatic in character of the modified folder arm and its action in turning the end folds. Figs. 14 to 23 inclusive, are diagrammatic views illustrating the manner in which a stick of gum or other article is wrapped by the machine.

The structure which we have shown in the drawings is that which we have found best adapted to the particular requirements of a machine of this character for wrapping rectangular sticks of chewing gum, but it will be obvious to one skilled in the art, after having obtained an understanding of our invention from the disclosures herein made, that the machine and its parts may be modified to adapt it to the requirement of other sizes and shapes of chewing gum sticks or other articles of merchandise without departing from the spirit and scope of our invention.

The particular machine shown in the drawings is constructed and arranged and its parts proportioned to wrap or "package" individual or single sticks of gum and to bunch or group a certain number of these individual sticks in order that, if desired, a common band or binder may be placed around each group. The individual or single sticks of gum are in this particular case rectangular in shape, being considerably longer than they are wide, and comparatively thin. Each individual stick is preferably provided with two wrappers or covers of thin suitable material, such as paper, but it will be obvious that two or more individual sticks of gum may be wrapped together or each individual stick may be provided with simply a single wrapper. However, as before intimated, the machine shown in the drawings is designed to apply or fold two wrappers around each individual stick of gum, and it is in connection with this machine that we will explain our invention. This machine takes the individual sticks of gum one by one from a supply and simultaneously folds or applies both wrappers around the sticks, one outside of the other. The inner wrapper, which for convenience of reference will be designated the "inner wrapper," is preferably of a thin moisture-proof material, such as waxed or paraffined paper, while the outer wrapper, hereinafter designated the "outer wrapper" is of heavier material and usually bears printed matter, such as the manufacturer's trade-mark and advertising legends. The two wrappers before being folded about the gum are placed flat against each other and are then simultaneously folded about each stick of gum. The inner wrapper is preferably fed to the machine in the form of a long strip from which the machine automatically cuts end pieces as they are required for the wrapping operations, and the strip is preferably substantially as wide as the length of the stick of gum. The outer wrappers, however, are supplied to the machine in the form of small flat rectangular pieces of paper stacked together so that the wrappers may be extracted from the supply one by one and folded about the gum, and these wrappers are preferably longer than the sticks so that end folds may be made to protect the ends of the sticks. After the sticks of gum have been wrapped they are discharged from the machine preferably in groups or bunches of five sticks, each with one end stick reversed or inverted with respect to the other sticks of the group so that the end folds of said reversed stick will be contained within the general confines of the group and form a neat package when a final band or binder is applied to the group.

In the machine shown, the various operating mechanisms by which the gum wrapping and handling operations are performed outstand or project from one face or side of a common supporting or mounting frame A, and the various gears, cams and other parts by which the gum wrapping and handling parts are driven in definite timed relation to each other, are for the most part mounted on the opposite side of said general supporting frame A. The reason for constructing a machine in this manner is to enable the operator to observe all of the wrapping operations from her general position at the side of the machine, so that in the event anything goes wrong she will be enabled to detect it at once and stop the machine or correct the defects before they become concealed in the final groups of sticks of gum which are discharged from the rear end of the machine; also this construction enables the driving gears, cams, and such parts to be placed in such position that they will not become clogged or accidentally injured. This frame is preferably in the form of a large flat plate of proper shape to support all of the parts in their coöperative relation. At the front end of the machine this frame member has a block 1 outstanding at substantially right angles to the plane thereof and arranged to support a magazine for holding a stack or plurality of individual sticks of gum 5 in proper feeding relation to the wrapping mechanism. This magazine is preferably in the form of a hollow rectangular chute $A^1$, the front face or side 2 of which is open for convenience in placing the gum therein. It is supported in an inclined position and substantially radially with respect to the rotary extractor mechanism.

The extreme lower rear edge of the magazine is cut away as at 6 (Fig. 3) for a distance slightly greater than the thickness of one stick of gum to provide a clear space for the removal of end sticks of the supply in a lateral or edgewise direction. The lower end of the magazine rests upon a pair of parallel horizontally disposed spaced arms 7 which support the supply or stack of sticks of gum in the magazine, the arms 7 being cut away, shown more clearly in Fig. 3, to accommodate the inclined position of the magazine with respect to the arms. The lower or end sticks of gum in the supply are extracted or withdrawn one by one therefrom by means of rotary mechanism disposed generally below the magazine and operating between the arms 7. This mechanism preferably consists of two large wheels or disks 8 keyed upon a shaft 9 to rotate in unison. These disks or members 8 are spaced apart and adapted to rotate at a constant speed. Each disk is provided with a plurality of radial arms or extractor members 10, as shown more clearly in Fig. 3. The axis of rotation of this mechanism is so arranged that the extreme ends of the radial extracting arms 10 will pass into engagement with the lowermost or end stick of gum in the supply magazine and in order that these arms, traveling in pairs may engage only the end sticks of gum in successive order their extreme ends are provided with rectangular notches or shoulders 11 which are preferably equal in depth to the thickness of a single stick of gum. These shoulders, of the arms 10 which move in the direction of the arrow in Fig. 3, strike the forward edges 12 of the end sticks of gum and extract or move them edgewise from the supply; the supply in the magazine advancing downwardly as each end stick is removed, as shown in Fig. 3 and in the diagrammatic view, Fig. 14.

The rotary extracting mechanism receives its motion preferably through a train of gears from a main shaft B in the lower part of the frame. This train of gears (Figs. 1 and 6) comprises a large gear 13 on the shaft 9 of the extractor mechanism, a smaller spur gear 14 on the main shaft B and a large intermediate gear 15 on shaft 15ª, all three of the gears being shown in dotted lines. As each end stick of gum is removed from the supply in the manner just described, it is carried forward toward the ends of the arms 7 and into a substantially horizontal position.

It will be seen from Figs. 3 and 15 that the cutaway portions 7ª of the edges of arms 7 are formed on arcs coincident with the arc described at the ends of the extractor arm so as to form guides along which the gum is moved, and above these edges are projections 16 outstanding from the forward face of the magazine and correspondingly curved on their lower edges so that in conjunction with the upper curved edges 7ª of the arms 7 they form restricted guideways or slots 17 to prevent the sticks from becoming displaced.

The forward end portions of the arms 7 have vertical slots 18 opening through their upper edges; the slots in both arms being transversely alined with respect to each other. These slots as will be observed from an inspection more particularly of Figs. 3, 15 and 16, are intended to support the wrappers on edge in position to receive their longitudinal folds about the traveling sticks of gum. By reference more particularly to these figures it will be seen that the paper or material which forms the inner wrapper C is carried as a long strip wound up in reel form and supported by a suitable spool or reel 20 in the upper portion of the frame. This strip of paper is passed between an upper pair of feed rolls 21 and 22.

The feed roll 22, as shown more clearly in Figs. 1 and 6, is mounted upon a shaft 22ª and is positively driven by means of a train of gears extending from its shaft to the large gear 12 on the shaft 9 of the rotary extractor mechanism. This train of gears comprises a gear 23 mounted upon the shaft 22ª and the intermediate intermeshing gears 24, 25 and 26, the latter of which meshes with the large gear wheel 13.

The gears 24, 25 and 26 are mounted respectively on the shafts 27 and 29, the latter two gears being mounted on the same shaft 29, and are so arranged and proportioned with respect to the rotary extractor mechanism that they will operate the feed rolls in proper timed relation thereto.

The feed roll 21 is carried on the lower end of a swinging arm 30 pivoted at 31 to the frame and provided with a spring 32 which yieldingly maintains the roll in proper feeding engagement with the strip of paper. The feed roll 21 derives its motion from a small gear 32ª which meshes with a similar gear 33 on the shaft 22ª. These two feed rolls serve to constantly feed the continuous strip of paper to a pair of shears D located below and which periodically clip or cut off end portions therefrom in time with the movement of the gum and other parts of the machine. These shears are indicated at D in Figs. 1 and 3 and are detailed in Figs. 9, 9ª and 9ᵇ.

The shears are composed of two blades or members 175 and 176 coöperating to sever end portions or "inner" wrappers C from the main strip of paper X which passes therebetween. The lower blade 176 is rotary in character and outstands from the end of the shaft 27 and is driven in proper timed relation by the same gears which were previously described in relation to the driving of the upper pair of feed rolls 21 and 22. The upper shear blade 175 is also mounted to outstand from the end of a stud or mounting member 177 but this stud is fixed in the frame plate A and is not intended to rotate.

The stud or mounting member 177 has a longitudinal groove or channel 178 in its under side in which the butt or inner end portion 179 of the upper shear blade is positioned. This butt end portion 179 is divided at 180 in the channel 178 so that it may oscillate or spring in a vertical plane and a spiral spring 181 constantly yieldingly presses upon the butt end portion to maintain the upper blade in shearing or cutting relation to the lower blade 176.

One of the important characteristics of this machine is that the various operating parts are arranged to operate upon the gum and wrappers without interrupting the movement thereof for the purpose of obtaining rapid operations, and consistent with this general purpose the shears are arranged so that they will operate upon the constantly moving strip to cut the end portions or inner wrappers therefrom. As before mentioned, the lower shear blade 176 is arranged to rotate preferably at constant speed in the direction of the arrow in Figs. 3 and 9ᵇ and its cutting edge 185 angularly disposed with respect to the cutting edge 186 of the upper blade 175. In other words, during the rotation of the lower blade the inner end portion 187 of its cutting edge arrives in shearing relation to the cutting edge of the upper blade before the motor end portion 188 arrives in shearing relation to the cutting edge of the upper blade. This necessarily causes some time to be consumed by the blades in cutting from the inner edge to the outer edge of the strip. Since a certain time period is consumed in making the cut from the inner edge of the strip to the outer edge, it will be noted that if these cutting edges were disposed exactly in a line at right angles to the inner and outer edges of the strip the result would be a slanting cut, so to speak. That is, a cut which would not be at right angles to the edges of the strip because of the fact that the strip is moving downwardly while the cut is progressing across the strip. In order, therefore, to provide a square or right angle cut I arrange the cutting edges of the shears so that they droop or incline downwardly from their inner end portions to their outer end portions, as shown particularly in Figs. 9 and 9$^a$. The degree which these cutting edges droop or incline is proportionated to the speed at which the strip moves downwardly, thus it will be seen that while the cut progresses across the strip from the inner edge of the strip to the outer edge thereof the strip is moved downwardly, but since the cutting edges of the shear blades are also inclined downwardly in the direction of the moving strip the resultant cut across the strip will be on a line substantially at right angles to the edges of the strip of paper; this cut being indicated by the dotted lines 190 of Fig. 9$^a$. It will be noted that the cutting edge 186 of the upper shear blade is inclined downwardly to a greater degree than the cutting edge 185 of the rotary shear blade so that this cutting edge 186 is disposed generally below the cutting edge 185 of the lower shear blade except when the cutting operation is taking place, it being yieldingly held in this position by the spring 181. During the cutting operation, however, the lower rotary blade engages the upper cutting blade and gradually raises it upwardly as the cutting operation progresses across the strip. The purpose of this arrangement is to insure the cutting edge of the blades being in proper cutting or shearing relation at all times during the cutting operation.

As the end pieces of paper which constitute the inner wrappers C and which have been successively sheared from the end of the main strip, leave the shears D they pass between a lower pair of feed rolls 34 and 34$^a$ which are mounted on shafts 28 and 29 and derive their motion from intermeshing gears 35 and 36 respectively, mounted on these shafts. The shaft 35, which carries feed roll 34 and its gear 35, are carried on the end of an arm 34$^b$ pivoted at 34$^c$ on the frame A, and a spring 34$^d$, acting on this arm, maintains the roll 34 in yielding relation to roll 34$^a$. These feed rolls, as shown in Figs. 13, 15 and 16, are located above the slots 18 in the end of the arms 7 and feed the wrappers downwardly until the lower edges C$^1$ of the wrappers C rest in the bottom or lower ends of these slots. The forward edges 16$^a$ of the projections 16 on the magazine coöperate with a fixed flat faced arm 37 outstanding from the frame plate A at right angles thereto, to form a guideway 16$^b$ for the wrappers and direct them from the feed rolls into the slots 18.

As before stated, the machine shown in the drawings is intended to apply to two wrappers, an "inner" and an "outer" one, to each stick of gum. We have heretofore described the manner in which the inner wrappers C are fed into position to be wrapped about the gum. Since, both wrappers are folded simultaneously about the gum we feed the outer wrappers into the same relative wrapping position as the inner wrappers C. These "outer" wrappers E, as before mentioned, are cut into the proper rectangular shape and size before being placed in the magazine and a stack of them is then placed in a vertically disposed magazine F mounted on the upper portion of the frame, the wrappers being arranged to lie in a horizontal position so that they may be extracted from the supply one by one in a horizontal direction. The bottom of this "outer" wrapper magazine is entirely open and the stack of wrappers, adjacent one edge thereof, rests upon an angularly disposed sharp pin point 38. This pin is held in a suitable bushing 39 which is supported in the end of an adjustable arm 40, the arm 40 being mounted on a stud 41 outstanding from the face of the frame plate A. The pin 38, as clearly shown in Fig. 3, pierces several of the lowermost sheets of wrappers E in the magazine and serves to permit only the lowermost or bottom sheet of the stack being withdrawn, it being necessary to tear the last sheet away from the pin. The withdrawing or extracting of the lowermost sheets of paper one by one is accomplished by means of a separator roll 45 disposed a little to one side of the vertical center of said stack of papers. This roll is constantly rotated by means of the train of gears 46, 47 and 26 (Fig. 6), which are mounted upon the roll shaft 48, the shaft 49, and the shaft 29, respectively; the latter gear 26 of this train meshing with the large gear 13 on the extractor mechanism shaft 9. The greater portion of the separator roll periphery 50 is smooth and polished so that when it is in contact with the bottom sheet in the stack it will not exert sufficient friction upon this bottom sheet to tear it away from the pin 38. A lesser portion of this periphery, however, is cut away and substituted by material which will exert sufficient friction upon the lowermost sheet in the stack to tear it from the pin 38 and feed it forward horizontally. A suitable construction for this purpose consists, as shown in Fig. 3, of a piece or tube of rubber, leather or similar frictional material 51 provided with a solid metal core 52 and bolted in the cut-away portion of the roll in such manner that the exposed surface 52$^a$ of the frictional material 51 will form a continuation of the periphery of the feed roll. When the frictional portion 51 of the feed roll arrives in contact with the lowermost sheet of the stack it tears this sheet from the prick pin 38 and passes it horizontally. As the sheet leaves the supply its forward edge enters between two feed rolls 55 and 56 which are mounted upon shafts 57 and 58 and derive their motion in the proper direction from the intermeshing gears 59, 60$^a$ and 60, respectively, the gear 60 being driven by the gear 47 of a previously described train.

The shaft 58 for the feed roll 56 is mounted on the frame plate A, but the feed roll 57 is carried by an arm 61 which is pivoted at 62 on the frame plate A and which is held by a spring 62$^a$. The "outer" wrappers are preferably fed in timed relation to the inner wrapper and the movement of the gum and hence the "outer" wrappers leave the feed rolls 55 and 56 in time to meet the "inner" wrappers separated from the main strip, and both wrappers enter the feed rolls 34 and 34$^a$ at substantially the same instant, as clearly shown in Fig. 3. From this point they are fed down through the guideway 16$^b$ to the bottom of the slots 18 in the arms 7. The diagrammatic view, Fig. 15, shows the two wrappers lying flat against each other with their lower longitudinal edges C$^1$ and E$^1$ coincident with each other and resting upon the bottoms of the arm slots 18. The wrappers are thus positioned in advance of the sticks of gum and lie across or transverse to the path of the sticks of gum. The sticks of gum are, as will be remembered, positively moved edgewise along the guideway 17 and their forward longitudinal edges 12$^a$ are impinged against the positioned wrappers C and E. The sticks strike the wrappers intermediate their upper and lower edges but nearer the lower edges C$^1$ and E$^1$ and the gum positively carries the wrappers with it.

On account of the restricted space between the upper edges 7$^a$ of the arms 7 and the lower edge 37$^a$ of the flat faced arm 37, the wrappers are simultaneously folded longitudinally around the forward edges 12$^a$ of the sticks of gum. That portion of the wrappers which lies below the sticks of gum is folded flat against the under surface 5$^a$ thereof and reaches almost to the lower rear edges 12 of the sticks of gum. That portion of the wrappers which lies above the upper surface of the gum is folded clear across this flat upper surface 5$^b$, as clearly shown in Figs. 3 and 16, and the excess of wrapper trails in the guideway 16$^b$ and around the lower edge 37$^a$ of the flat faced arm 37, this excess being sufficient to fold around the rear edge 12 of the stick of gum and to lap over the first fold on the surface 5$^a$ of the gum, as will be later explained. The edge 37$^a$ of the arm 37 is rounded off so as to provide a smooth surface for the wrapper to prevent tearing and also to prevent the wrapper from being folded or creased too sharply. It will be noted that the lower portions of the slots 18 are expanded or enlarged. The reason for this is to allow some freedom of movement for the lower edge portions of the wrappers within the slots and prevent these edge portions from curling outwardly away from the gum surface 5$^a$ during the folding operation.

The partially wrapped sticks of gum are discharged from the wrapper folding parts and from the extractor arms preferably in a tangential direction and into receivers of a rotary transfer or transport mechanism G. This mechanism, in the machine shown in the drawings, consists of a large drum, so to speak, keyed to a shaft 65 which is journaled in the frame plate A and which rotates constantly at a uniform speed, and in the same direction as the rotary extractor mechanism, deriving its motion from the shaft 9 through the medium of the train of gears 66, 67 and 68 (Fig. 6). The gear 66 of this train is keyed to the shaft 65 of the rotary transfer mechanism and the gear 68 is fastened to the shaft 9. The intermediate gear 67 is mounted on a stud shaft 69 mounted in the frame A. The large rotary transfer drum has two annular circumferential slots or grooves 70 coincident with the large rotary extractor mechanism members 10 so that the arms 11 of said extractor mechanism may overlap, so to speak, the circular or arcual boundary of the rotary transfer drum. In other words, it will be seen more particularly by reference to Figs. 1, 3, 4 and 5, that the circumferential arcs of the rotary extractor mechanism and the rotary transfer mechanism intersect. This arrangement is extremely important because the rotary extractor mechanism is thereby enabled to deliver the partially wrapped sticks edgewise in successive order and radially to the rotary transfer mechanism while both mechanisms are rotating, and the movement of the sticks of gum is not interrupted. Among the important advantages of this arrangement over an intermittent or interrupted operation of these mechanisms, lies in the fact that a large output is produced without the necessary wear and tear incident to machines which are intermittent in character.

The rotary transfer drum has a plurality of outstanding flanges or ribs 71, and these ribs or projections 71 in conjunction with thin plates 72 form a plurality of radial gum receiving pockets or cells 73 around the periphery of the rotary transfer drum. The thin plates 72 are preferably rigid so that the partially wrapped sticks of gum will be retained in their cells while being transported by the transfer mechanism by the resiliency of the wrappers acting against the walls of the cells, thus being sufficient to prevent relative slippage of the wrappers and sticks. These gum receiving cells or pockets are preferably equally spaced around the circumference of the drum and the rotation of the drum is so timed with relation to the rotary extractor mechanism that a cell or pocket arrives in position opposite the guide and folding channel 17 just as a partially wrapped stick of gum emerges therefrom. Thus, as clearly shown in Figs. 3 and 16, the gum will be shoved or discharged by the extractor arms into the receiving cell or pocket 73 of the rotary transfer mechanism while both the rotary transfer mechanism and the rotary extractor mechanism are moving, thereby eliminating delay at this point in the operation of the machine.

The outer edges of the ribs or projections 71 are beveled, as will be noticed, so as to enlarge in a sense the entrance to the gum receiving slots and thereby insure the entrance of the sticks into their respective cells. The rigid lower edge $37^a$ of the flat faced arm 37 performs another function in the wrapping operation. It will be noticed that this rigid edge $37^a$ and the arc shaped continuation thereof which forms the other face $37^b$ of the arm lie in such close proximity to the rear edge 12 of the moving stick of gum after it is in its cell 73, that the gum and wrapper just clear the edge $37^a$ and the arc $37^b$. Thus the rear edge 12 of the gum is rubbed, so to speak, around this edge $37^a$ and the surface $37^b$ and the wrappers are given a comparatively sharp longitudinal crease or fold around the upper rear edge 12 of the gum. Furthermore, in the event of any inaccuracies in the size of the sticks of gum, the arc shaped surface $37^b$ of the arm 37 operates as the gum is moved past it to shove or firmly seat the sticks in their respective cells 73. As the gum continues its travel with the rotary transfer mechanism the unfolded portion of the wrappers assume the rather loose free position substantially as indicated in Figs. 1 and 16. These unfolded portions trail along loosely with the sticks of gum as they are carried around by the rotary transfer mechanism and are eventually folded over flat against the faces of the sticks of gum so as to overlap the first longitudinally folded portion.

The rotary transfer mechanism carries the partially wrapped sticks of gum through substantially one-half a circle of travel and they are discharged or ejected therefrom at a point substantially diametrically opposite that at which they were received by the transfer mechanism. In traveling through this half circle, however, the sticks are inverted and their undersides $5^a$ now become the upper sides or faces. The final longitudinal folds or flaps are accomplished by means of a folder arm 80 in conjunction with the rotary transfer mechanism and is completed preferably just prior to the ejectment of the sticks from the transfer mechanism.

The arm 80, as clearly shown in Figs. 3, 4, and 17, moves upward on an arc until a partially wrapped stick of gum on the transfer mechanism just passes by or clears its lower edge or nose 81, and it then moves down on this same arc closely following the stick of gum and at the same time moving along the surface $5^a$ of the stick so as to further crease the unfolded portion of the wrappers around the edge 12 of the stick and lay the wrappers substantially flat against said surface $5^a$ of the gum so that they overlap the first folded portion of the wrappers. It will be seen that the lower edge or nose 81 of this folder arm is properly rounded and polished so as to rub the wrappers, so to speak, into place as the arm follows the gum on the transfer mechanism. The purpose in making the plates 72 of the gum receiving cells comparatively thin with their outer edge tapered or smoothed off to form almost a knife edge, is to enable these plates to occupy but very little space between the first and last longitudinal fold of the wrappers, and thereby enable the wrappers to be flatly laid. Furthermore, they do not interfere with the operation of the final folder arm 80 as it moves along the face of the gum in completing the final longitudinal fold, and they slide easily from between the wrapper folds, when the sticks are ejected. The folder arm 80, in order that it may rise and fall in proper timed relation with the arrival of sticks on the transport mechanism, is carried upon one end of an oscillating arm 82. The arm 82 may be rigidly mounted on a shaft 83, but it is preferably rotatably mounted thereon and actuated by means of a leaf spring $83^a$ (Figs. 4 and 7) one end of which is positioned between two pins $83^b$ on the arm, and the other end of which is anchored in the shaft 83 by means of a pin $83^c$. This construction provides a yielding connection between the arm 82 and the shaft 83 which causes the folder arm 80 to accurately follow the transfer mechanism and the gum therein. The center of the shaft 83 is preferably located directly above the center of the transport mechanism shaft 65. The oscillating movement of the folder arm is obtained by means of a large cam 84 which is mounted upon and directly receives its motion from the extractor mechanism shaft 9, as clearly shown in Figs. 2 and 6. This cam has a cam groove 85 in its face which operates an arm 86 fastened to the rocker shaft 83 (see Fig. 2). This arm 86 carries at its end a small roller 87 which follows the cam groove 85. The disposition of these parts and their operations are obviously a matter of design in accordance with the particular requirements of the article to be wrapped, and hence may be varied or modified without departing from the scope or spirit of our invention.

So far we have described the operations concerned in the longitudinal folding of the wrappers around the gum, but it will be remembered that the outer wrappers are cut somewhat longer than the sticks of gum so that they may be folded over against one surface of the sticks of gum to protect the ends thereof and to provide a neat appearing well finished package. During the longitudinal folding operations heretofore described, the excess end portions of the gum wrappers are given the same folds as the portions of the wrappers which actually cover the sticks, hence when the sticks arrive almost in the position to be discharged or ejected from the transfer mechanism, the open ends of the wrappers lie in the same longitudinal planes as the remaining portions of the wrappers. It is necessary, therefore, that these end portions be folded around the ends of the sticks of gum before they are discharged from the machine. On each side of the transfer mechanism we provide a rectangular ledge or shoulder block 90 (see Figs. 3, 4, 5, and 7), the inner side or vertical faces 91 of which are spaced apart to allow a stick of gum to pass therebetween, there being sufficient clearance at the ends of the sticks of gum to allow for the thickness of the paper which constitutes the wrappers. Just prior to the time that the sticks of gum are to be ejected from the transport mechanism they pass downwardly between the shoulder or ledge blocks 90, and the end portions of the wrapper are turned at right angles to the plane of the sticks of gum, as clearly shown diagrammatically in Fig. 18. This operation preferably begins a short time before the folder arm 80 has finished the final longitudinal folding operation. As the end folding progresses the edge 81 of the folder arm 80, in moving clear of the stick, as shown in Fig. 19, tucks the wrapper snugly into the corners $C^2$ formed by the folding end portions $5^c$. In this manner the wrapper will be stretched longitudinally tight in condition for the end fold to be completed without buckling the wrappers.

After the completion of the longitudinal folding operations and the upturning to right angular position of the ends of the wrappers the sticks of gum are ejected from the transfer mechanism into a mechanism which assembles or collects a number of sticks to form a group, and reverses one of the sticks so that a neat appearing package may be produced. As before mentioned, the sticks of gum are ejected from the transfer mechanism at a point substantially diametrically opposite from that in which they are received by said mechanism. In the machine shown in the drawings we provide ejector arms 100 which are spaced apart and are mounted upon a shaft 101 journaled in the frame plate A of the machine. This shaft is rocked in its bearings by an arm 102 on the other side of the frame plate, which arm has a roller 103 which travels in the groove 104 of a large cam 105. This cam is directly mounted upon the main shaft B of the machine, and its groove 104 is so formed that it will rock the shaft and the ejector arms in proper timed relation to the arrival of the gum in the ejecting position. By reference more particularly to Figs. 1, 3, 5, and the diagrammatic views 19 and 20, it will be seen that these ejector arms extend upward into the peripheral grooves 70 of the transfer mechanism in position to strike the edges of the sticks and eject or remove them horizontally from their cells in the transfer drum, the ends of these ejector arms being suitably formed for this purpose. Thus it will be seen that the ejector arms retract into the grooves 70 so that their upper ends lie within the circle which includes the bottoms of the gum receiving cells 73 and thereby allow the transfer drum to carry the gum into a position in the path of the ejector arms. The ejector arms move the sticks of gum directly into an assembling and reversing mechanism.

As shown more particularly in Figs. 1, 2, 3, 4, 5, 7, 8, 20, 21 and 22, we provide an inverted bridge or U-shaped member H mounted to reciprocate vertically in a suitable guide frame 110; the guide frame having guide slots $110^a$ for the flanges $110^b$ on the bridge member. This bridge member H is reciprocated in its guides by means of a vertical member 111, the upper end of which is attached to the member H and the lower end of which has a fork 112 (see Fig. 1). This forked end bridges the main shaft B and prevents relative displacement of this end of the member 111 in any direction except the vertical. The member 111 has a roller 113 which is positioned within and follows a cam groove 114 in the face of a large cam 115 keyed to rotate with the main shaft B. The inner vertical faces or sides 116 of the member H has a number of thin instanding shelves or projections 117 which are spaced apart to form slots 118 for receiving the sticks of gum as they are ejected from the transfer mechanism. The corresponding projections on opposite sides 116 of the member H are alined with each other and corresponding opposite slots 118 are each intended to receive a single stick of gum. By reference more particularly to Figs. 8 and 22 it will be noticed that the sticks of gum are supported at their end portions only, the greater central portion of the sticks of gum being unsupported so as to leave a clear open space in which a discharge arm may operate. The stick supporting shelves 118 have beveled edges 119 which begin substantially coincident with the faces 91 of the folding blocks 90, and as the sticks are moved by the ejector arms into the receiving slots 112 these beveled edges act upon the partially folded ends 5$^c$ of the wrappers and fold them down flat against the face of the gum so that by the time the sticks reach their resting position in the slots 118 the wrapping operations will be completed.

In Figs. 3, 4, and 19 it will be noted that the ends of the folder arm 80 have their corner portions 80$^d$ cut away to allow room for twist in the end folds when said end folds are turned from right angled position to their flatly folded position by the beveled projections in the assembler. It is customary in practice to group or bunch five individually wrapped sticks of gum together and apply a common outer band or binder to the group to produce what is generally known a five cent package, and the particular machine shown in the drawings is constructed with this purpose in view. Accordingly the assembler and reversing mechanism is arranged to receive five individually wrapped sticks of gum which are discharged as a group or bunch and which, if desired, may be fed to a machine for placing a common band or binder about the group. One end stick of the group is reversed with respect to the other sticks in the group whereby the folded portions of its wrappers will lie adjacent the correspondingly folded portions of the next adjacent stick of gum in the group. The fifth stick of gum, which is the one to be reversed, is ejected by the ejector arms 100 into a reverser mechanism.

In the construction shown more particularly in Figs. 3, 4, 5, 7, 8 and 22, the upper stick of gum of the group is the one which is reversed but it may, if desired, be the lower or bottom stick of the group. In fact, in Figs. 10, 11, 12 and 13 we illustrate a modified construction by which this may be accomplished.

In the upper portion of the bridge reciprocating member H we provide two rotary heads 125 placed directly opposite each other and rigidly connected to rotate together by means of a flat or web portion 126. These heads are provided with suitable shafts 127 which are journaled in the vertical side portions of the reciprocating member H. On the shaft 127 nearest the frame plate A is a ratchet wheel 128 which is rotated by a pair of pawls 129 and 130 pivotally mounted at 131 and 132, respectively, on the frame plate A of the machine and yieldingly held into the path of the ratchet wheel 128 by means of an interconnected spring 133 (Fig. 3). The reciprocating member H carries the ratchet wheel 128 into and out of engagement with the pawls 129 and 130 during its operation, and the teeth of the pawls are so arranged that they will act upon the ratchet to rotate it always in one direction. Thus, by reference to Figs. 3 and 7, it will be seen that when the ratchet is moved upward the end 135 and teeth 136 of the pawl 130 engage the teeth of the ratchet 128 and rotate the reverser about a quarter turn, and as the reciprocating member H moves downwardly the teeth 137 and 138 of the pawl 129 act upon the ratchet wheel 128 to impart another quarter revolution in the same direction. Hence during one cycle of movement of the reciprocating member H the reverser will be rotated substantially a half turn. The reverser heads 125 are provided each with two wings or projections 140 so arranged as to provide gum receiving slots 141 and 142 on opposite sides of the central web 126. Because of the fact that the wings 140 are shorter than the fixed projections 117, I provide two small lugs 125$^a$ (Figs. 4, 7, and 8), which are arranged to form, in a sense, continuation of the projections 140 and assist in turning the end folds of the sticks of gum which are ejected into the slots 141 and 142. These wings 140 have beveled edges similar to the stationary wings or shelves 117 so that they also will complete the folding of the end portions of the wrappers when the gum is ejected into these slots 141 and 142 by the ejector arms 100. It will be noted that these wings or projections 140 on the reverser also serve to form the upper wall of the upper slot 118, and their beveled edges fold the ends of the stick which enter this upper slot.

The parts of the machine are so proportioned and arranged that when the first stick of each group to be formed is ejected from the transfer mechanism, one of the gum receiving slots 141 and 142 of the reverser will be positioned by the reciprocating member H in line to receive the stick.

In order to avoid long strokes of the reciprocating member H in positioning the several gum receiving slots in line with the sticks of gum as they leave the transport mechanism, the cam 115 which actuates the reciprocating member H is so proportioned that the slots are not filled in successive order but rather in a prearranged order best adapted to enable it to make short strokes. This can best be explained by reference more particularly to the diagrammatic rear view Fig. 22. At the left-hand side of said view we have placed a series of numbers from (#1, #2, #3, #4, #5) these numbers being correspondingly placed opposite the gum receiving slots of the reverser and assembler. These numbers indicate the order in which the slots are filled with gum. We have already mentioned that the first stick of gum of the group is ejected into one or other of the slots of the reverser, whichever slot happens to be in position farthest from the upper slot 118. This is indicated as #1 in Fig. 22. After the reverser slot (#1) is filled the reciprocating member moves upwardly until the slot indicated as #2 is positioned to receive the next ejected stick and when this slot is filled the reciprocating assembler moves still farther upwardly until the last or lower slot indicated as #3 is positioned to receive the third stick of gum ejected. The reciprocating assembler then moves downwardly one step until the slot indicated as #4 is in position to receive the fourth ejected stick of gum, and the assembler then moves still farther downwardly until the slot indicated as #5 is finally positioned to receive the fifth ejected stick of gum. When the five slots are filled the group is discharged therefrom, and the cycle of operations of the assembler and reverser again repeated.

During the operation of the assembler H the pawls 129 and 130 are engaged by the ratchet wheel and, as before explained, gradually rotate the reverser through a half revolution, so that by the time four slots 118 are filled with sticks the first stick of gum which entered the reverser will have been reversed and arranged in its relative place in the group, and its folded ends 5ᶜ positioned within the confines of the group, as clearly shown in Fig. 22. The cam which reciprocates the member H is arranged to maintain this member H in motion during the time consumed in ejecting the sticks from the transport mechanism to their slots 117, 141 and 142; this movement being in unison with the rotary transfer mechanism whereby the movement of the sticks will not be interrupted in transferring them from the rotary transport mechanism to the assembler and reverser mechanism. The group, as a whole, is then discharged from the assembler and reverser by means of a discharge arm 150, the upper end portion 151 of which operates within the open space between the ends of the projections 117 and 140. This arm operates against the edges of the sticks in the assembled group and removes them substantially horizontally from their holding slots and through a nozzle or discharge mouth 153, as illustrated more particularly in Figs. 3, 4, 7, 8, and 23. It will be noted that the gum holding slots of the reverser mechanism and the gum holding slots 118 are converged generally toward the discharge mouth 153, and that the upper and lower walls 154 of the discharge mouth are also converged in the same general direction toward the outer end of the mouth, causing the sticks to move together into a closely compacted group which may be fed to the binder or banding machine. Or a band or binder may be placed about the group by hand. The discharge arm 150 may derive its motion from any suitable part of the machine or in any suitable manner. In the machine shown we mount this arm upon a rocker shaft 155 which shaft may be rocked in proper timed relation by means of an arm 156 mounted thereon having a roller 157 arranged to follow properly proportioned cam groove 158 in the face of the large cam 105.

In completing the folding of the wrappers about the sticks of gum it may be desirable to fold the end portion 5ᶜ flat against the surface of the stick opposite to that on which the longitudinal overlapped folds are made. In order that this operation may be understood as being embraced within the scope of our invention we illustrate in Figs. 10, 11, 12 and 13, a modification of those parts of the machine by which this reverse end folding is accomplished. In these views it will be noticed that the end folding blocks or ledges 90 are dispensed with, and instead the end portions of the folder arm 80 are provided with projections 80ᵃ which form shoulders 80ᵇ spaced apart just far enough to admit therebetween a stick of gum and allow a slight clearance for the end portions of the wrappers. As illustrated in Figs. 12 and 13, however, it will be noticed that the nose or lower edge 81 is given a slightly different formation in section so that the shoulders 80ᵇ do not come into action until the edge portion 81 has moved partially over the stick of gum and laps the last longitudinal fold of the wrappers substantially flat against the stick of gum, as illustrated in Fig. 12. After this arm has laid the last longitudinal fold of the wrapper substantially as shown in Fig. 12, the continued arcual movement of the arm about its pivotal center brings the projections 80ᵃ and the shoulders 80ᵇ into engagement with the end portions 5ᵃ of the wrappers and turns them downwardly at right angles. This manner of folding the end portions of the wrappers makes advisable a slightly different arrangement of the parts of the assembler and reversing mechanism.

As illustrated in Fig. 10, it will be observed that the reciprocating member H is simply inverted and the reverser is below the assembling slots 118, and the pawls 129 and 130 for operating the reverser are likewise placed below instead of above it. It will be noted also that the discharge arm is positioned above the reversing mechanism instead of below it. The operation of this mechanism illustrated in Fig. 10, however, and the filling of the assembler slots is identical to that previously described.

What we claim is:

1. The combination of a holder for a supply of articles to be wrapped, means for removing the articles from the supply and maintaining them continually in motion, means for interposing a wrapper in the path of movement of the article, and stationary means for partially folding the wrapper about the said article while it is being moved by said article removing means.

2. The combination of a holder for a supply of articles to be wrapped, means for removing an article from the supply and maintaining it continually in motion, means for interposing a wrapper in the path of the article, and stationary means adjacent the path of movement of the article for partially folding the wrapper about the article, while it is being moved by said article removing means.

3. The combination of a holder for a supply of articles to be wrapped, means for removing an article from the supply and maintaining it continually in motion, means for interposing a wrapper in the path of the article, stationary means adjacent the path of movement of the article for partially folding the wrapper about the article while it is being moved by said article removing means, and means for assembling a plurality of wrapped articles in a group and discharging the group.

4. The combination of a holder for a supply of articles to be wrapped, means for removing an article from the supply and maintaining it continually in motion, means for interposing a wrapper in the path of the article, stationary means adjacent the path along which the article is moved by said article removing means for partially folding the wrapper about the article, means for assembling a plurality of wrapped articles in a group and discharging the group, and means for reversing one of said articles with respect to the rest of the articles in the group.

5. The combination of a magazine for holding a supply of articles to be wrapped, means for successively withdrawing the articles from said magazine, means for interposing a wrapper in the path of the moving article, means for partially folding the wrapper of said article, means for reversing the article and simultaneously making additional folds in the wrapper about the article, and means for ejecting the article and simultaneously completing the folding of the wrapper about said article.

6. The combination of a magazine for holding a supply of articles to be wrapped, means for successively withdrawing the articles from said magazine, means for interposing a wrapper in the path of the moving article, means for partially folding the wrapper of said article, means for reversing the article and simultaneously making additional folds in the wrapper about the article, means for ejecting the article and simultaneously completing the folding of the wrapper about said article, an assembler for grouping a plurality of wrapped articles, and means for reversing one of said wrapped articles with respect to the rest in the group.

7. The combination of a magazine for holding a plurality of articles to be wrapped, an extractor for successively removing the articles therefrom, means for interposing a wrapper in the path of the article, means for partially folding the interposed wrapper about the article as it is moved by said extractor, constantly operating mechanism for receiving the partially wrapped article from said extractor while the article is moving and for further folding the wrapper about the article as the article moves, an assembler for grouping a plurality of wrapped articles, and means for ejecting the article from said receiving means and for completing the folding of the wrapper as the article is transferred to said assembler.

8. The combination of a magazine for holding a plurality of articles to be wrapped, an extractor for successively removing the articles therefrom, means for interposing a wrapper in the path of the article, means for partially folding the interposed wrapper about the article as it is moved by said extractor, constantly operating mechanism for receiving the partially wrapped article from said extractor while the article is moving and for further folding the wrapper about the article as the article moves, an assembler for grouping a plurality of wrapped articles, means for ejecting the article from said receiving means and for completing the folding of the wrapper as the article is transferred to said assembler, and a reverser coöperatively related to said assembler for inverting one of said wrapped articles with respect to the other articles in the group.

9. The combination of a magazine for holding a supply of articles to be wrapped, an extractor for taking the articles successively from said magazine, means operating in timed relation to the moving articles for successively interposing wrappers in the path thereof and partially folding said wrapper about the article, a constantly operating transfer mechanism arranged to receive the partially wrapped article from said extractor without interrupting the movement of the article, means coöperating with said transfer mechanism for additionally folding the wrapper about said article, and means for ejecting the article from said moving transfer mechanism and completing the folding of said wrapper thereabout.

10. The combination of a magazine for holding a supply of articles to be wrapped, an extractor for taking the articles successively from said magazine, means operating in timed relation to the moving articles for successively interposing wrappers in the path thereof and partially folding said wrapper about the article, a constantly operating transfer mechanism arranged to receive the partially wrapped article from said extractor without interrupting the movement of the article, means coöperating with said transfer mechanism for additionally folding the wrapper about said article, means for ejecting the article from said moving transfer mechanism and completing the folding of said wrapper thereabout, an assembler for grouping the plurality of said wrapped articles, and means coöperating therewith for reversing one of the wrapped articles with respect to the others of the group.

11. The combination of a magazine for holding a supply of articles to be wrapped, a constantly operating extractor for taking the articles from said magazine, a timed mechanism for interposing wrappers in the path of the articles, means coöperating with said extractor for partially folding the wrapper about said article, a constantly operating timed transfer mechanism arranged to receive the partially wrapped articles, a follower coöperating with said transfer mechanism for additionally folding the wrappers about the articles while the articles are moving, and means for ejecting the partially wrapped articles from said transfer mechanism and for simultaneously completing the folding of the wrappers thereabout.

12. The combination of a magazine for holding a supply of articles to be wrapped, a constantly operating extractor for taking the articles from said magazine, a timed mechanism for interposing wrappers in the path of the articles, means coöperating with said extractor for partially folding the wrapper about said article, a constantly operating timed transfer mechanism arranged to receive the partially wrapped articles, a follower coöperating with said transfer mechanism for additionally folding the wrappers about the articles while the articles are moving, means for ejecting the partially wrapped articles from said transfer mechanism and for simultaneously completing the folding of the wrappers thereabout, an intermittent assembler operating to group a number of articles and simultaneously invert one of said wrapped articles with respect to the others in the group, and means for closely compacting said group and discharging it from the machine.

13. The combination of a magazine for holding a supply of articles in stacked relation to be wrapped, a rotary extractor operating to successively remove the articles one by one from the supply, means for placing wrappers in the path of the articles and coöperating with said extractor for folding the wrappers partially about said articles while said articles are moving, a rotary mechanism for taking the partially wrapped articles from said extractor without interrupting their movement, a follower coöperating with said rotary mechanism for further folding the wrappers about said articles while they are moving, and means for taking the partially wrapped moving articles from said rotary mechanism and simultaneously completing the folding of the wrappers about said articles.

14. The combination of a magazine for holding a stack of individual sticks of gum to be wrapped, a constantly operating rotary extractor for successively removing the end sticks from said stack and moving them edgewise, means for interposing wrappers transverse to the edges of said moving sticks and upturning to partially fold the wrappers thereabout during the continued movement of said stick, a constantly operating mechanism for receiving the partially wrapped moving sticks, a follower coöperating therewith to further fold the wrappers about the sticks while the sticks are moving, an ejector for ejecting the moving sticks from said constantly operating mechanism, and means coöperating with said ejector for completing the folding of the wrappers about said sticks and for assembling a group of completely wrapped articles.

15. The combination of a magazine for holding a stack of individual sticks of gum to be wrapped, a constantly operating rotary extractor for successively removing the end sticks from said stack and moving them edgewise, means for interposing wrappers transverse to the edges of said moving sticks and upturning to partially fold the wrappers thereabout during the continued movement of said stick, a constantly operating mechanism for receiving the partially wrapped moving sticks, a follower coöperating therewith to further fold the wrappers about the sticks while the sticks are moving, an ejector for ejecting the moving sticks from said constantly operating mechanism, means coöperating with said ejector for completing the folding of the wrappers about said sticks and for assembling a group of completely wrapped articles, a reversing device carried by said assembler, means for receiving and reversing one of said wrapped sticks with respect to the other sticks in the group, and means for discharging the groups of sticks.

16. The combination of a magazine for holding a stack of sticks of gum to be wrapped, means adapted by continuous movement to successively extract sticks of gum from said magazine and to move them edgewise, means for feeding wrappers in the path of said moving sticks with their faces toward the edges of said sticks, and means coöperating with said extracting means for folding the wrappers about the sticks while said sticks are moving.

17. The combination of means for feeding flat pieces of wrapping material, a magazine for holding a stack of sticks of gum, an extractor for successively removing sticks of gum from said magazine and impinging them edgewise against the faces of said wrappers by a continuous movement of said extractor, and means for folding the wrappers about said edges while the sticks are moving.

18. The combination of a restricted guideway, means for placing wrappers across said guideway, a magazine for holding a stack of sticks of gum, and means adapted by continuous movement for successively removing the sticks from said stack and moving them edgewise along said guideway against the faces of the wrappers, said means operating without interruption to draw the wrappers through said guideway and cause them to fold about the edges of said sticks.

19. The combination of a restricted guideway, means for placing wrappers across said guideway, a magazine for holding a stack of sticks of gum, means adapted by continuous movement for successively removing sticks from said stack and moving them edgewise along said guideway against the faces of the wrappers, said means operating without interruption to draw the wrappers through said guideway and cause them to fold about the edges of said sticks, and means for receiving the partially wrapped sticks from said extractor while they are moving and for completing the folding of the wrappers about said sticks.

20. The combination of means forming a restricted guideway, means for placing wrappers across said guideway, a magazine for holding a supply of sticks of gum, continuously moving extractor mechanism for successively taking the end sticks of gum from said supply and impinging them edgewise against the wrappers placed across said guideway, and by a continued movement operating to draw the wrappers with the sticks along said guideway to fold the wrappers about said sticks, and means for receiving the moving sticks from said extractor.

21. The combination of means forming a restricted guideway, a magazine for holding a supply of sticks of gum to be wrapped, mechanism for taking the sticks of gum from said magazine and feeding them edgewise, means for feeding wrappers in the path of movement of said sticks whereby the wrappers will be drawn by the moving sticks through said restricted guideway and thereby partially folded around the sticks, mechanism arranged to receive the partially wrapped sticks without interrupting their movement, a follower acting to further fold the wrappers about said sticks, and end folding means coöperating with said mechanism for completing the folding of said wrappers and for removing the sticks from said mechanism.

22. The combination of a magazine for holding a supply of sticks of gum to be wrapped, rotary extracting mechanism for removing the sticks of gum edgewise from said supply, a wrapper supply and means for feeding said wrappers across the path of the moving sticks of gum in time to be struck by the edge of the sticks, stationary folding means for folding the positioned wrappers about the edges of the moving sticks, rotary transfer mechanism into which the moving sticks are discharged and which coöperates with said stationary folding means to further fold the wrappers about the sticks, a follower member arranged to follow the movement of said rotary transfer mechanism and complete the longitudinal folding of the wrappers about the sticks, stationary end folding mechanism arranged to turn the ends of the wrappers at an angle to the plane of the sticks of gum while said sticks are moving, and means for folding the turned ends of the wrappers flat against the faces of the sticks.

23. The combination of a magazine for holding a supply of sticks of gum to be wrapped, rotary extracting mechanism for removing the sticks of gum edgewise from said supply, a wrapper supply and means for feeding said wrappers across the path of the moving sticks of gum in time to be struck by the edge of the sticks, stationary folding means for folding the positioned wrappers about the edges of the moving sticks, rotary transfer mechanism into which the moving sticks are discharged and which coöperates with said stationary folding means to further fold the wrappers about the sticks, a follower member arranged to follow the movement of said rotary transfer mechanism and complete longitudinal folding of the wrappers about the sticks, stationary and folding mechanism arranged to turn the ends of the wrappers at an angle to the plane of the sticks of gum while said sticks are moving, means for folding the turned ends of the wrappers flat against the faces of the sticks, an assembler for grouping the plurality of wrapped sticks, and a reverser for inverting one end stick in the group with respect to the remaining sticks in the group.

24. The combination of a magazine for holding a supply of sticks of gum to be wrapped, mechanism for taking said sticks of gum from said supply, means coöperating with said mechanism for partially folding wrappers about said gum, and transport mechanism separate from said folding means for receiving the partially wrapped sticks of gum without interrupting the movement thereof and for carrying them to final wrapping mechanism.

25. The combination of a magazine for holding a supply of sticks of gum to be wrapped, extractor mechanism for taking said sticks of gum from said supply and partially folding wrappers thereabout, transport mechanism for receiving the partially wrapped sticks of gum without interrupting the movement thereof and for carrying them to final wrapping mechanism, and mechanism for taking the partially wrapped sticks of gum from said transport mechanism and completing the folding of the wrapper previously partially wrapped about the gum by the extractor mechanism without interrupting the movement of the sticks of gum.

26. The combination of a magazine for holding a supply of pieces of gum to be wrapped, a rotary mechanism for taking the end sticks from said supply and moving them edgewise, a continuous source of wrapper supply, means for cutting the individual wrappers from said source and positioning them substantially transverse in the path of movement of the pieces of gum, means coöperating with said rotary extractor mechanism for partially folding the wrappers about the longitudinal edges of the moving pieces of gum, a transport mechanism for taking the partially wrapped pieces of gum from said extractor mechanism and for moving said pieces of gum in folding relation to said folding means, a folder arm arranged to follow each piece of gum while in the transport mechanism and complete the longitudinal folding of the wrapper, stationary means coöperating with said transport mechanism for turning the end portions of the wrapper, an ejector for removing the pieces of gum from said transport mechanism, and an assembler arranged to receive the gum from said transport mechanism and coöperating with said ejector to fold the turned end portions of said wrapper flat against the pieces of gum.

27. The combination of a magazine for holding a supply of pieces of gum to be wrapped, continuously operating means for removing the pieces of gum from said supply and partially folding wrappers thereabout, mechanism for completing the folding of the said wrapper about the pieces of gum, and transport mechanism for receiving and reversing the partially wrapped pieces of gum and feeding them in reversed position to said completing means.

28. The combination of a magazine for holding a supply of pieces of gum to be wrapped, an extractor for taking the pieces of gum from said supply, means coöperating with said extractor mechanism for partially folding wrappers about said pieces of gum while they are being moved by the extractor, final wrapper folding mechanism for completing the folding of the said wrappers, and intermediate transport mechanism arranged to receive the partially wrapped pieces and carry them to the final folding mechanism without interrupting the movement of said pieces of gum.

29. The combination of a magazine for holding a supply of pieces of gum to be wrapped, an extractor for taking the pieces of gum from said supply, means coöperating with said extractor mechanism for partially folding wrappers about said pieces of gum while they are being moved by the extractor, final wrapper folding mechanism for completing the folding of the said wrappers, intermediate transport mechanism arranged to receive the partially wrapped pieces and carry them to the final folding mechanism without interrupting the movement of said pieces of gum, and means for grouping a plurality of wrapped pieces.

30. The combination of a magazine for holding a plurality of pieces of gum to be wrapped, constantly moving rotary extractor mechanism for successively taking the end pieces from said supply and moving them edgewise, means for feeding the wrappers in the path of successive pieces of gum and in position to be struck by the moving pieces of gum, partially folding mechanism coöperating with said extractor mechanism for folding the wrappers as the pieces move, mechanism for finally folding the wrappers completely about said pieces and intermediate transfer mechanism operating to transfer the partially wrapped pieces to the final folding mechanism without interrupting the movement of the pieces.

31. The combination of a magazine for holding a supply of pieces of gum to be wrapped, means for removing the pieces of gum from said magazine and partially folding wrappers about the portions of said pieces, rotary mechanism adapted to receive the pieces of gum from said wrapping means, and having cells into which the wrapped portions of the pieces of gum are inserted, thin walls for said cells, a follower member for folding the unfolded portions of the wrappers flat against the said surface of said thin walls, and means for ejecting the pieces of gum from their cells in a plane substantially parallel to the plane of said thin walls.

32. A mechanism for wrapping machines comprising a rotary carrier having a plurality of thin members forming gum receiving cells in combination, means for inserting sticks of gum into said cells, means for partially folding wrappers about said sticks prior to insertion into said cells, means coöperating with said rotary carrier for folding the remaining portions of said wrappers flat against the said surface of the thin walls of said cells, and mechanism for ejecting the pieces of gum from their cells in the direction of the plane of said walls.

33. The combination of a magazine for holding a supply of sticks, means for receiving partially wrapped sticks, a feeder continuously movable to successively feed sticks from said supply to said receiving means, means forming a restricted folding guideway through which the sticks are fed to said receiving mechanism, and means for interposing wrappers in the path of the moving sticks whereby said wrappers will be partially folded about said sticks.

34. The combination of a magazine for holding a supply of sticks of gum to be wrapped, stationary folding mechanism, means for positioning wrappers in said stationary folding mechanism, and a feeder continuously movable to successively remove sticks from said magazine and impinging them against said wrappers to cause the wrappers to be folded about said sticks by said folding mechanism.

35. The combination of a magazine for holding a supply of sticks of gum to be wrapped, stationary folding mechanism, means for positioning wrappers in said stationary folding mechanism, a rotary feeder continuously movable to successively remove sticks from said magazine and impinging them against said wrappers to cause the wrappers to be folded about said sticks by said folding mechanism, and a rotary carrier for receiving the partially wrapped sticks from said rotary feeder.

36. The combination of a rotary carrier adapted to receive and reverse sticks of gum and having a plurality of stick receiving cells, means for feeding partially wrapped sticks of gum into cells of said carrier, and means coöperating with said rotating carrier for completing the wrapping of said sticks, after they have been reversed by said carrier.

37. The combination of a rotary carrier having a plurality of radial gum receiving cells, means for feeding sticks of gum into said cells with wrappers partially folded about them, and a follower coöperating with said carrier when moving to further fold the wrappers about said sticks, means for moving said sticks out of said carrier and means to complete the wrapping operation as the sticks are moved out of said carrier.

38. The combination of a radially celled rotary carrier having thin cell forming walls relatively stationary with respect to said carrier, a magazine for holding a supply of sticks of gum, means for removing the sticks from said magazine, partially folding the wrappers longitudinally about said sticks and ejecting them into the cells of said carrier, folder arm moving with said carrier for laying the wrappers flat against the outer face of said thin walls, and means for ejecting the wrapped sticks in a plane parallel with the plane of the thin walls.

39. The combination of a machine for holding a supply of sticks of gum to be wrapped, a rotary feeding mechanism adapted to extract the sticks of gum from said mechanism and move them edgewise, wrapping means for partially folding wrappers about said moving sticks, a rotary receiver having stick receiving cells traveling in an arc overlapping the circumference of said rotary feeding mechanism for receiving the partially wrapped sticks edgewise without interrupting the movement thereof.

40. The combination of means for holding a supply of sticks of gum to be wrapped, a constantly rotating feeding mechanism for removing the sticks from said supply and ejecting them tangentially to said feeding mechanism, and a constantly rotating receiver having radial stick receiving cells traveling in an arc which intersects the circumference of said rotary feeding mechanism and arranged to receive the ejected sticks of gum radially.

41. The combination of means for holding a supply of sticks of gum to be wrapped, a constantly rotating feeding mechanism for removing the sticks from said supply and ejecting them tangentially to said feeding mechanism, a constantly rotating receiver having radial stick receiving cells traveling in an arc which intersects the circumference of said rotary feeding mechanism and arranged to receive the ejected sticks of gum radially, and mechanism for folding wrappers about the moving sticks of gum before they are ejected from said feeding mechanism.

42. The combination of means for holding a supply of sticks of gum to be wrapped, a constantly rotating feeding mechanism for removing the sticks from said supply and ejecting them tangentially to said feeding mechanism, a constantly rotating receiver having radial stick receiving cells traveling in an arc which intersects the circumference of said rotary feeding mechanism and arranged to receive the ejected sticks of gum radially, wrapping mechanism for folding portions of wrappers about said moving sticks before they are ejected from said feeding mechanism, and means coöperating with said receiver for folding the remaining portions of said wrappers about said sticks.

43. The combination of means for holding a supply of sticks of gum to be wrapped, a constantly rotating feeding mechanism for removing the sticks from said supply and ejecting them tangentially to said feeding mechanism, a constantly rotating receiver having radial stick receiving cells traveling on an arc which intersects the circumference of said rotary feeding mechanism and arranged to receive the ejected sticks of gum radially, wrapping mechanism for folding portions of wrappers about said moving sticks before they are ejected from said feeding mechanism, means coöperating with said receiver for folding the remaining portions of said wrappers about said sticks, and means for ejecting the sticks from said rotating receiver.

44. The combination of means for holding a supply of sticks of gum to be wrapped, a constantly rotating feeding mechanism having a plurality of members for successively taking the end sticks from said supply and moving them edgewise, means for feeding wrappers in the path of the moving sticks, means for folding portions of the wrappers about said moving sticks, and a rotary carrier having a plurality of stick receiving cells traveling on an arc which intersects an arc described by said members for receiving the partially wrapped sticks radially.

45. The combination of means for holding a supply of sticks of gum to be wrapped, a constantly rotating feeding mechanism having a plurality of members for successively taking the end sticks from said supply and moving them edgewise, means for feeding wrappers in the path of the moving sticks, means for folding portions of the wrappers about said moving sticks, a rotary carrier having a plurality of stick receiving cells traveling on an arc which intersects an arc described by said members for receiving the partially wrapped sticks radially, and means for seating the sticks in the cells of said rotary carrier.

46. The combination of means for holding a supply of sticks of gum to be wrapped, a constantly rotating feeding mechanism having a plurality of members for successively taking the end sticks from said supply and moving them edgewise, means for feeding wrappers in the path of the moving sticks, means for folding portions of the wrappers about said moving sticks, a rotary carrier having a plurality of stick receiving cells traveling on an arc which intersects an arc described by said members for receiving the partially wrapped sticks radially, and a folder device coöperating to fold other portions of said wrappers about said sticks while they are being carried by said carrier.

47. The combination of means for holding a supply of sticks of gum to be wrapped, a constantly rotating feeding mechanism having a plurality of members for successively taking the end sticks from said supply and moving them edgewise, means for feeding wrappers in the path of the moving sticks, means for folding portions of the wrappers about said moving sticks, a rotary carrier having a plurality of stick receiving cells traveling on an arc which intersects an arc described by said members for receiving the partially wrapped sticks radially, a folder device coöperating to fold other portions of said wrappers about said sticks while they are being carried by said carrier, and mechanism for ejecting said sticks from said carrier and for completing the folding of the wrappers thereabout.

48. The combination of a magazine for holding a supply of sticks of gum to be wrapped, continuously operating mechanism for successively folding wrappers longitudinally about said sticks of gum, an ejector for removing the longitudinally wrapped sticks from said continuously operating wrapping mechanism, and stationary means coöperating with said ejector for folding over the ends of said wrappers.

49. The combination of a magazine for holding a supply of sticks of gum to be wrapped, wrapping mechanism for longitudinally folding wrappers about said sticks of gum, an ejector for removing the longitudinally wrapped sticks from said wrapping mechanism, means coöperating therewith for folding over the ends of said wrappers and for assembling a certain number of said wrapped sticks in a group, and means for reversing one of said wrapped sticks with respect to the remaining sticks in the group.

50. The combination of means for folding wrappers about sticks of gum, a reciprocating assembler for receiving and collecting a plurality of wrapped sticks from said means, and a reverser carried by said assembler and rotatable relative thereto for inverting one of said wrapped sticks with respect to the other collected sticks.

51. The combination of mechanism for receiving a plurality of wrapped sticks of gum and assembling them in a group, reversing mechanism carried by said receiving mechanism and rotatable relative thereto for reversing one of the wrapped sticks with respect to the others in the group, and means for feeding wrapped sticks of gum to said assembling and reverser mechanisms.

52. The combination of mechanism for receiving a plurality of wrapped sticks of gum and assembling them in a group, reversing mechanism carried by said receiving mechanism and rotatable relative thereto for reversing one of the wrapped sticks with respect to the others in the group, means for feeding wrapped sticks of gum to said assembling and reverser mechanisms.

53. The combination of a reciprocating assembling mechanism having means for receiving a plurality of wrapped sticks of gum, reversing mechanism carried by said assembler for receiving a wrapped stick of gum and reversing it with respect to those in said assembling mechanism, and means for feeding wrapped sticks of gum to said assembling and reversing mechanisms.

54. The combination of a reciprocating assembler having means for holding a group of wrapped sticks of gum, reversing mechanism for receiving a wrapped stick of gum and reversing it with respect to the sticks in said assembling mechanism, and means for feeding wrapped sticks of gum one by one to said assembling and reversing mechanisms while said mechanisms are moving.

55. An assembling mechanism comprising a reciprocating member having a plurality of slots for receiving and holding wrapped sticks of gum, a reversing mechanism having slots for receiving a wrapped stick of gum and adapted during the reciprocations of said assembling mechanism for reversing the stick of gum which it received with respect to the other sticks while the slots of said assembling mechanism are being filled, and means for feeding wrapped sticks of gum one by one to said assembling mechanism while it is moving.

56. The combination of a reciprocating member having a rotary reversing device, means forming gum receiving cells in said reciprocating member in proximity to said rotary device, means for feeding wrapped sticks of gum to said rotary device and to said receiving cells one by one, and means for actuating said rotary device while said cells are being filled to invert one of said wrapped sticks of gum with respect to the others in said cells.

57. The combination of a reciprocating member having a rotary reversing device, means forming gum receiving cells in said reciprocating member in proximity to said rotary device, means for feeding wrapped sticks of gum to said rotary device and to said receiving cells one by one, means for actuating said rotary device while said cells are being filled to invert one of said wrapped sticks of gum with respect to the others in said cells, and means for discharging the sticks of gum from said cells and rotary device after said stick has been inverted.

58. The combination of a reciprocating U-shaped member having spaced instanding projections forming gum receiving slots, a rotary reverser having slots for receiving and inverting a wrapped stick of gum, means for feeding wrapped sticks of gum to said reverser and to said slots one by one, and an ejector for simultaneously removing the sticks of gum from said reverser and slots after they are filled and the stick inverted.

59. The combination of a magazine for holding a stack of sticks of gum to be wrapped, a constantly rotating mechanism having a plurality of radial arms for successively extracting the end sticks from said supply and moving them edgewise, means for feeding an inner and an outer wrapper for each stick of gum in the path of the moving sticks, stationary means coöperating with said rotating mechanism for folding portions of the wrappers longitudinally about the moving sticks, a transport mechanism constantly rotating in the same direction as the rotating mechanism and having a plurality of members forming radially disposed cells, said means traveling on an arc which intersects an arc of travel of the extracting arms whereby the sticks will be inserted in said cells while said mechanisms are rotating, a folder arm adapted to fold the remaining portions of said wrappers longitudinally about said sticks while they are in the cells of said transport mechanism, and means for folding the end portions of said wrappers.

60. The combination of a magazine for holding a stack of sticks of gum to be wrapped, a constantly rotating mechanism having a plurality of radial arms for successively extracting the end sticks from said supply and removing them edgewise, means for feeding an inner and an outer wrapper for each stick of gum in the path of the moving sticks, stationary means coöperating with said rotating mechanism for folding portions of the wrappers longitudinally about the moving sticks, a transport mechanism constantly rotating in the same direction as the rotating mechanism and having a plurality of members forming radially disposed cells, said means traveling on an arc which intersects an arc of travel of the extracting arms whereby the sticks will be inserted in said cells while said mechanisms are rotating, a folder arm adapted to fold the remaining portions of said wrappers longitudinally about said sticks while they are in the cells of said transport mechanism, means for folding the end portions of said wrappers, means for radially ejecting the sticks of gum from their cells, and final folding mechanism coöperating with said ejector means for folding the end portions of said wrappers.

61. The combination of a magazine for holding a supply of sticks of gum to be wrapped, a constantly rotating extractor mechanism for withdrawing the end sticks successively from said supply and moving them edgewise, means forming a restricted guideway through which said sticks are moved, means for holding wrappers transversely of said guideway in position to be struck by the sticks, means operable during the continued movement of the sticks of gum through said guideway for folding portions of said wrappers longitudinally about said sticks, and a multi-cellular receiver for receiving the partially wrapped sticks radially without interrupting their movement.

62. The combination of a magazine for holding a supply of sticks of gum to be wrapped, a constantly rotating extractor mechanism for withdrawing the end sticks successively from said supply and moving them edgewise, means forming a restricted guideway through which said sticks are moved, means for holding wrappers transversely of said guideway in position to be struck by the sticks, means operable during the continued movement of the sticks of gum through said guideway for folding portions of said wrappers longitudinally about said sticks, a constantly rotating receiver, thin projections thereon forming radial cells for receiving the partially wrapped sticks from said extractor mechanism without interrupting the movement of the sticks, and means coöperating with said constantly rotating mechanism to complete the folding of the remaining portions of the wrappers about the sticks of gum.

63. The combination of a magazine for holding a supply of sticks of gum to be wrapped, means forming a restricted arc-shaped guideway leading from said magazine, stationary folding means positioned in proximity to said guideway, means for positioning wrappers transversely of said guideway in the path of movement of the gum, constantly rotating extractor mechanism for moving the end sticks of gum along said guideway against the faces of said wrappers and for carrying the wrappers and sticks in folding relation to said stationary folding means, and a constantly rotating carrier for receiving the partially wrapped sticks of gum.

64. The combination of a magazine for holding a supply of sticks of gum to be wrapped, means forming a restricted arc-shaped guideway leading from said magazine, stationary folding means positioned in proximity to said guideway, means for positioning wrappers transversely of said guideway in the path of movement of the gum, constantly rotating extractor mechanism for moving the end sticks of gum along said guideway against the faces of said wrappers and for carrying the wrappers and sticks in folding relation to said stationary folding means, a multi-cellular rotary receiver operating to receive the partially wrapped sticks of gum from said extractor mechanism and carry them away from said extractor mechanism, and means for setting the sticks in the cells of said receiver.

65. The combination of a magazine for holding a supply of sticks of gum to be wrapped, means for withdrawing the sticks one by one from said supply and longitudinally folding portions of wrappers thereabouts, a constantly rotating transport mechanism arranged to receive the sticks and partially folded wrappers, said transport mechanism having a plurality of thin outstanding projections forming stick-receiving cells, a folder arm operating after the sticks and wrappers are in said cells for folding the remaining longitudinal portions of said wrappers flat against the outer faces of said thin projections, and means for ejecting the sticks and wrappers from said transport mechanism in the direction of the plane of said thin projections.

66. The combination of a magazine for holding a supply of sticks of gum to be wrapped, means for withdrawing the sticks one by one from said supply and longitudinally folding portions of wrappers thereabouts, a constantly rotating transport mechanism arranged to receive the sticks and partially folded wrappers, said transport mechanism having a plurality of thin outstanding projections forming stick-receiving cells, a folder arm operating after the sticks and wrappers are in said cells for folding the remaining longitudinal portions of said wrappers flat against the outer faces of said thin projections, means for ejecting the sticks and wrappers from said transport mechanism in the direction of the plane of said thin projections, and end folding mechanism for folding the end portions of the wrappers flatly upon one face of the sticks.

67. The combination of an assembler mechanism, including a reciprocating member having opposed slot forming projections for supporting wrapped sticks of gum at their end portions, means for feeding wrapped sticks of gum one by one to said slots, and a discharge arm operating intermediate said slots for simultaneously removing a group of wrapped sticks of gum from said slots.

68. The combination of an assembler mechanism, including a reciprocating member having opposed slot forming projections for supporting wrapped sticks of gum at their end portions, means for feeding wrapped sticks of gum one by one to said slots, a discharge arm operating intermediate said slots for simultaneously removing a group of wrapped sticks of gum from said slots, and a converged wall member forming a discharge mouth through which said groups of sticks are passed, the con-verging walls thereof operating to closely compact the sticks in the groups.

69. The combination of an assembler mechanism, including a reciprocating memmber having opposed slot forming projections for supporting wrapped sticks of gum at their end portions, means for feeding wrapped sticks of gum one by one to said slots, a rotary reverser carried by said reciprocating member and having similar stick-receiving slots and adapted to invert its stick of gum with respect to the remaining sticks in said slots, and a discharge arm operating intermediate the end portions of said slots and simultaneously against the central portions of the sticks in said slots and reverser for ejecting therefrom a group of wrapped sticks.

70. The combination of a holder for a supply of articles to be wrapped, rotary means for extracting the articles from the supply, rotary means for transporting the articles, and means for guiding the articles from the extractor means to the transporting means along a line substantially tangent to the first said means.

71. The combination of a holder for a supply of articles to be wrapped, rotary means for extracting the articles from the supply, rotary means for transporting the articles, and means for guiding the articles from the extractor means to the transporting means along a line substantially tangent to the first said means and substantially radial to the second said means.

72. The combination of a holder for a supply of articles to be wrapped, rotary means for extracting the articles from the supply, rotary means for transporting the articles, means for guiding the articles from the extractor means to the transporting means along a line substantially tangent to the first said means, and means for interposing a wrapper in the line of travel of the articles to be wrapped.

73. The combination of a holder for a supply of articles to be wrapped, continuously operating rotary means for extracting the articles from the supply, continuously operating rotary means for transporting the articles, means for guiding the articles from the extractor means to the transporting means along a line substantially tangent to the first said means, means for interposing a wrapper in the line of travel of the articles to be wrapped, and stationary means for folding the wrapper about said articles as they are moved from the extracting means to the transporting means.

74. The combination of a holder for a supply of articles to be wrapped, rotary means for extracting the articles from the supply, rotary means for transporting the articles so positioned relative to the extracting means that its arc of rotation intersects the arc of rotation of the extractor means, and means for guiding the articles to be wrapped from the extractor means to the transporting means on a line substantially tangent to the extractor means.

75. The combination of a holder for a supply of articles to be wrapped, rotary means for extracting the articles from the supply, rotary means for transporting the articles so positioned relative to the extracting means that its arc of rotation intersects the arc of rotation of the extractor means, means for guiding the articles to be wrapped from the extractor means to the transporting means on a line substantially tangent to the extractor means, and means for interposing a wrapper in the path of motion of the article to be wrapped.

In testimony whereof we have signed our names to this specification, in the presence of two subscribing witnesses, on this 18 day of March A. D. 1913.

FRANK B. REDINGTON.
MICHAEL J. MILMOE.

Witnesses:
FRED G. BROOKS,
HELEN M. PATTERSON.